US010872329B2

(12) United States Patent
Sofronas

(10) Patent No.: US 10,872,329 B2
(45) Date of Patent: Dec. 22, 2020

(54) CONTACTLESS MOBILE PAYMENT SYSTEM

(71) Applicants: MOBILE ELEMENTS CORP, Wilmington, DE (US); Dionisios A. Sofronas, Kalamata (GR)

(72) Inventor: Dionisios A. Sofronas, Kalamata (GR)

(*) Notice: Subject to any disclaimer, the term of this patent is extended or adjusted under 35 U.S.C. 154(b) by 147 days.

(21) Appl. No.: 15/757,007

(22) PCT Filed: Sep. 5, 2016

(86) PCT No.: PCT/EP2016/070816
§ 371 (c)(1),
(2) Date: Mar. 2, 2018

(87) PCT Pub. No.: WO2017/037278
PCT Pub. Date: Mar. 9, 2017

(65) Prior Publication Data
US 2018/0276652 A1    Sep. 27, 2018

(30) Foreign Application Priority Data

Sep. 3, 2015    (EP) .................................... 15183640

(51) Int. Cl.
*G06Q 20/32*    (2012.01)
*G06Q 20/02*    (2012.01)
*G06Q 20/20*    (2012.01)

(52) U.S. Cl.
CPC ....... *G06Q 20/3278* (2013.01); *G06Q 20/027* (2013.01); *G06Q 20/20* (2013.01)

(58) Field of Classification Search
CPC ... G06Q 20/3278; G06Q 20/20; G06Q 20/027
See application file for complete search history.

(56) References Cited

U.S. PATENT DOCUMENTS

| 7,831,246 B1* | 11/2010 | Smith ................... G06Q 20/40 |
| | | 455/408 |
| 8,126,806 B1* | 2/2012 | DiMartino ........... G06Q 20/105 |
| | | 340/5.7 |
| 8,660,955 B2* | 2/2014 | Ledbetter ............... G06Q 40/00 |
| | | 705/44 |
| 9,525,694 B2* | 12/2016 | Pender ................ H04L 63/0838 |
| 9,754,255 B1* | 9/2017 | Ma ........................ H04W 12/06 |

(Continued)

OTHER PUBLICATIONS

Y. Labrou, J. Agre, L. Ji, J. Molina and W.-. Chen, "Wireless wallet," The First Annual International Conference on Mobile and Ubiquitous Systems: Networking and Services, 2004. MOBIQUITOUS 2004., Boston, MA, USA, 2004, pp. 32-41. (Year: 2004).*

(Continued)

*Primary Examiner* — Ashford S Hayles
(74) *Attorney, Agent, or Firm* — Franco S. De Liguori; DP IP Group

(57) ABSTRACT

This disclosure relates to methods and systems for mobile payments, where financial transactions can be conducted between customers and merchants via their mobile devices when their mobile devices are brought in close proximity to each other. The customer enters their payment authorization code on their own mobile device, in order to authorize payment transactions. The disclosed system design and functionality allows for intuitive, real time, inexpensive and secure payment and cash-exchange transactions.

21 Claims, 18 Drawing Sheets

(56) References Cited

U.S. PATENT DOCUMENTS

| | | | | |
|---|---|---|---|---|
| 9,922,323 B2* | 3/2018 | Buhrmann | | G06Q 20/40 |
| 10,235,668 B1* | 3/2019 | Ellis | | G06Q 20/363 |
| 10,360,560 B2* | 7/2019 | Bryant | | G06Q 20/3224 |
| 10,380,583 B1* | 8/2019 | Ellis | | G06Q 20/322 |
| 2002/0007345 A1* | 1/2002 | Harris | | G06Q 20/02 705/44 |
| 2003/0061163 A1* | 3/2003 | Durfield | | G06Q 20/04 705/44 |
| 2003/0182194 A1* | 9/2003 | Choey | | G06Q 20/20 705/16 |
| 2004/0174965 A1* | 9/2004 | Brahm | | G06Q 20/3674 379/88.19 |
| 2005/0038738 A1* | 2/2005 | Peck | | G06Q 20/102 705/40 |
| 2005/0075985 A1* | 4/2005 | Cartmell | | G06Q 20/12 705/67 |
| 2005/0097049 A1* | 5/2005 | Writer | | G06Q 20/00 705/44 |
| 2005/0125686 A1* | 6/2005 | Brandt | | H04L 63/1466 726/22 |
| 2005/0154671 A1* | 7/2005 | Doan | | G06Q 20/10 705/39 |
| 2005/0160003 A1* | 7/2005 | Berardi | | G06Q 20/352 705/14.17 |
| 2005/0199708 A1* | 9/2005 | Friedman | | G06Q 20/4014 235/380 |
| 2005/0246278 A1* | 11/2005 | Gerber | | G06Q 20/02 705/44 |
| 2006/0122943 A1* | 6/2006 | Mann, III | | G06Q 20/385 705/65 |
| 2006/0191995 A1* | 8/2006 | Stewart | | G06Q 20/40 235/379 |
| 2006/0206350 A1* | 9/2006 | Edwards | | G06Q 20/40 705/44 |
| 2006/0212561 A1* | 9/2006 | Feng | | H04L 63/0227 709/223 |
| 2007/0027816 A1* | 2/2007 | Writer | | G06Q 20/02 705/65 |
| 2007/0084913 A1* | 4/2007 | Weston | | G06Q 20/403 235/380 |
| 2007/0143230 A1* | 6/2007 | Narainsamy | | G06Q 20/04 705/75 |
| 2007/0156436 A1* | 7/2007 | Fisher | | G06Q 20/401 455/552.1 |
| 2007/0244813 A1* | 10/2007 | Zhou | | G06Q 20/42 705/40 |
| 2008/0109319 A1* | 5/2008 | Foss | | G07F 7/1008 705/17 |
| 2008/0208681 A1* | 8/2008 | Hammad | | G06Q 20/045 705/13 |
| 2008/0217400 A1* | 9/2008 | Portano | | G06Q 20/403 235/380 |
| 2008/0255947 A1* | 10/2008 | Friedman | | G06Q 20/32 705/35 |
| 2008/0275748 A1* | 11/2008 | John | | G06F 21/6263 705/35 |
| 2008/0281737 A1* | 11/2008 | Fajardo | | H04L 63/102 705/35 |
| 2009/0240626 A1* | 9/2009 | Hasson | | G06Q 20/3278 705/75 |
| 2009/0265273 A1* | 10/2009 | Guntupalli | | G06Q 20/1085 705/44 |
| 2010/0049615 A1* | 2/2010 | Rose | | G06Q 20/206 705/17 |
| 2010/0102122 A1* | 4/2010 | Skowronek | | G06Q 20/3278 235/380 |
| 2010/0293189 A1* | 11/2010 | Hammad | | G06F 21/31 707/769 |
| 2010/0306076 A1* | 12/2010 | Taveau | | G06Q 20/3229 705/26.8 |
| 2010/0312703 A1* | 12/2010 | Kulpati | | G06Q 20/322 705/44 |
| 2011/0006113 A1* | 1/2011 | Uchikura | | G06Q 30/06 235/380 |
| 2011/0016051 A1* | 1/2011 | Trifiletti | | G06Q 20/401 705/44 |
| 2011/0035319 A1* | 2/2011 | Brand | | G06Q 20/10 705/44 |
| 2011/0119141 A1* | 5/2011 | Hoyos | | G06Q 20/204 705/17 |
| 2011/0131104 A1* | 6/2011 | Rose | | G06Q 20/32 705/17 |
| 2011/0137804 A1* | 6/2011 | Peterson | | H04W 4/029 705/77 |
| 2011/0225057 A1* | 9/2011 | Webb | | G06Q 40/02 705/16 |
| 2011/0246359 A1* | 10/2011 | O'Brien | | G06Q 20/02 705/39 |
| 2011/0264543 A1* | 10/2011 | Taveau | | G06Q 20/32 705/23 |
| 2011/0271109 A1* | 11/2011 | Schilling | | G06F 21/44 713/168 |
| 2011/0307381 A1* | 12/2011 | Kim | | G06Q 20/40 705/44 |
| 2012/0094596 A1* | 4/2012 | Tysowski | | G06Q 10/10 455/41.1 |
| 2012/0124656 A1* | 5/2012 | Senac | | H04L 9/3213 726/9 |
| 2012/0150601 A1* | 6/2012 | Fisher | | G06Q 20/20 705/14.23 |
| 2012/0166334 A1* | 6/2012 | Kimberg | | G06Q 20/401 705/44 |
| 2012/0173348 A1* | 7/2012 | Yoo | | G06Q 20/20 705/16 |
| 2012/0203664 A1* | 8/2012 | Torossian | | G06Q 20/3224 705/26.41 |
| 2012/0221470 A1* | 8/2012 | Lyon | | H04L 63/102 705/44 |
| 2012/0226565 A1* | 9/2012 | Drozd | | G07F 7/0893 705/16 |
| 2012/0290421 A1* | 11/2012 | Qawami | | G06Q 20/20 705/21 |
| 2012/0290482 A1* | 11/2012 | Atef | | H04L 63/126 705/44 |
| 2012/0330787 A1* | 12/2012 | Hanson | | G06Q 30/00 705/26.41 |
| 2013/0046692 A1* | 2/2013 | Grigg | | G06Q 20/4016 705/44 |
| 2013/0073365 A1* | 3/2013 | McCarthy | | G06Q 20/12 705/14.23 |
| 2013/0117155 A1* | 5/2013 | Glasgo | | G06Q 30/00 705/26.35 |
| 2013/0218765 A1* | 8/2013 | Hammad | | G06Q 20/4016 705/41 |
| 2013/0226800 A1* | 8/2013 | Patel | | G06Q 20/3224 705/44 |
| 2013/0246203 A1* | 9/2013 | Laracey | | G06Q 20/401 705/21 |
| 2013/0254049 A1* | 9/2013 | Todd | | G06Q 20/202 705/18 |
| 2014/0074675 A1* | 3/2014 | Calman | | G06Q 40/12 705/35 |
| 2014/0207575 A1* | 7/2014 | Freed-Finnegan | | G06Q 30/0641 705/14.58 |
| 2014/0244462 A1* | 8/2014 | Maenpaa | | G06Q 30/04 705/35 |
| 2014/0250006 A1* | 9/2014 | Makhotin | | G06Q 20/3227 705/41 |
| 2014/0258123 A1* | 9/2014 | Fernandes | | G06Q 20/401 705/44 |
| 2014/0279111 A1* | 9/2014 | Mahaffey | | G06Q 20/3278 705/21 |
| 2014/0279503 A1* | 9/2014 | Bertanzetti | | G06Q 20/3224 705/44 |
| 2015/0032527 A1* | 1/2015 | Hunt | | G06Q 30/0256 705/14.26 |

(56) References Cited

U.S. PATENT DOCUMENTS

| | | | | |
|---|---|---|---|---|
| 2015/0161586 A1* | 6/2015 | Bailey | ............ | G06Q 20/405 |
| | | | | 705/44 |
| 2015/0319161 A1* | 11/2015 | Dimmick | ............ | H04W 12/06 |
| | | | | 726/4 |
| 2015/0332271 A1* | 11/2015 | Collins | ............ | G06Q 20/322 |
| | | | | 705/44 |
| 2015/0350177 A1* | 12/2015 | Sharp | ............ | G06Q 20/3227 |
| | | | | 726/6 |
| 2016/0125412 A1* | 5/2016 | Cannon | ............ | G06Q 20/4014 |
| | | | | 705/44 |
| 2016/0171476 A1* | 6/2016 | Guan | ............ | G06Q 20/405 |
| | | | | 705/44 |
| 2016/0232515 A1* | 8/2016 | Jhas | ............ | G06Q 20/3224 |
| 2016/0292666 A1* | 10/2016 | Chauhan | ............ | G06Q 20/3224 |
| 2016/0316365 A1* | 10/2016 | Buhler | ............ | H04L 63/083 |

OTHER PUBLICATIONS

G. Me, M. A. Strangio and A. Schuster, "Mobile Local Macropayments: Security and Prototyping," in IEEE Pervasive Computing, vol. 5, No. 4, pp. 94-100, Oct.-Dec. 2006. (Year: 2006).*

A. Zdravkovic, "Wireless point of sale terminal for credit and debit payment systems," Conference Proceedings. IEEE Canadian Conference on Electrical and Computer Engineering (Cat. No. 98TH8341), Waterloo, Ontario, Canada, 1998, pp. 890-893 vol. 2. (Year: 1998).*

G. Me and A. Schuster, "A secure and reliable local payment system," VTC-2005-Fall. 2005 IEEE 62nd Vehicular Technology Conference, 2005., Dallas, TX, USA, 2005, pp. 2761-2765. (Year: 2005).*

* cited by examiner

CONTACTLESS MOBILE PAYMENT SYSTEM

FIELD OF INVENTION

This invention relates generally to the field of contactless mobile payments and more specifically to mobile payments using generic mobile devices, such as smart phones, which support a wireless interface, such as near field communication (NFC) or radio frequency identification (RFID), to conduct contactless payments, when the mobile devices are brought in close proximity to each other.

BACKGROUND OF THE INVENTION

Several attempts have been made over the past years to develop an ecosystem where electronic payments could become a viable alternative to micropayments and cash transactions. The overwhelming majority of such initiatives have failed since the Consumers never adopted them.

The major reasons for all prior failed attempts to create a successful mobile payment solution mainly relates to cost and consumer adaptation. Up to date, mobile payment solutions emulate the existing credit card processing mechanisms where only the physical credit card is to be replaced by a mobile device, while the rest of the credit card ecosystem remains unchanged. In essence the credit card is transformed into a mobile handset while the POS terminal and the rest of the credit card architecture and subsystems remain unchanged. This approach does not reduce transaction costs nor changes Consumer perception and habits to improve adaptation.

Today's credit card processing architecture is outdated, as it was first introduced in the 1960s, and the credit card legacy architecture was never redesigned from the ground up to meet the new technological standards available today.

To create a viable electronic transaction system that can be accepted by the masses requires low cost mobile POS terminals for accepting payments, to be made available to all merchants, alongside with a mobile device that can authenticate transactions, which can also be made available to all consumers. Payments can then be initiated by the merchant and authorized by the Consumer, at any location and at any time via their mobile devices. To increase the speed of the transaction as well as enhance the consumer experience the transaction needs to be made contactless.

Mobile telephony has experienced huge success and acceptance by the masses with penetration reaching over 100% in most countries, and with population coverage reaching nearly 98% in many places around the globe. Further, the smart phone devices and tablets are seeing enormous uptake and provide the perfect digital communication device to conduct financial transactions. In addition mobile networks provide a secure access for exchanging data between the handset and the network, which is essential in secure financial transactions.

A disadvantage of payment systems using mobile devices is that they require storing sensitive information such as credit and debit card information on the mobile device and transmitting this information to the POS terminal. This creates security issues and represents an obstacle to a widespread use. For example, the document US 2014/0330626 A1 describes how a consumer can hold their NFC enabled mobile device in proximity to an NFC enabled POS terminal and with a single "wave" or "tap" to automatically redeem coupons, pay for a purchase using a default payment card or a selected card. The NFC enabled device includes a secure element with a payment application, payment credentials, and other digital artifacts such as coupons. Thus, payment credentials are stored on the secure element of the NFC enabled device and transmitted to the POS terminal.

The system described in US 2014/0330626 A1 has the additional disadvantage that the consumer has to obtain the secure element or "sticker" on which payment credentials are stored and which is to be used with the mobile device. This represents a major obstacle for a widespread use of payment systems using mobile devices.

Exposing the disclosed ecosystem to all customers and merchants, coupled with low cost service, enhanced security and anti-fraud mechanisms creates a mobile payment ecosystem that can realistically be used as an equivalent to micropayments and direct cash exchanges.

In particular, the present invention addresses the security issues caused by the storage of sensitive information for payment purposes on a mobile device and their transmission therefrom, such as credit and debit card information. Another objective is to circumvent the need for the customer to obtain specific hardware which stores payment credentials.

SUMMARY OF THE INVENTION

The present invention seeks to provide improved mobile payment systems and methodologies.

Aspects of the invention allow a mobile device, such as a mobile phone, to act as a payment authorization device as well as a point of sale (POS) terminal via a software application, enabling mobile-to-mobile financial transactions.

In particular, sensitive payment information such as credit and debit card information is not stored on the customer's mobile terminal and is not transmitted between the mobile terminal and the POS terminal, as in the prior art. Instead, customer account information is stored on a transaction server and associated with a unique identification (ID). The unique ID is associated with the customer. The unique ID is also stored on the mobile terminal and transmitted to the PUS terminal in order to initiate a financial transaction. The transaction server further stores mobile terminal information associated with the unique ID for identifying the customer's mobile phone. This enables the transaction server to request authorization of the financial transaction through the customer's mobile terminal, without the need to enter authorization codes on the POS terminal.

The transaction server further stores POS terminal information for identifying a POS terminal of a merchant. The POS terminal information is associated with merchant account information and is also stored on the POS terminal. When the POS terminal receives the unique ID from the customer's mobile terminal to initiate a financial transaction, the POS terminal transmits the unique ID, the POS terminal information and a payment amount to the transaction server.

The association between the unique ID, the customer account information, and the mobile terminal information or between the POS terminal information and the merchant account information can be created through a registration procedure.

The financial transaction therefore obviates the need to store the customer account information and the merchant account information on the mobile terminal and the POS terminal, respectively. Neither is it necessary to transmit them between these devices. Instead, the unique ID and the POS terminal information are used which are associated with customer account information and merchant account information. It is also not necessary that the customer authorizes the financial transaction on the POS terminal which is another security issue. Instead, the authorization is performed through the customer's mobile terminal using the mobile terminal information associated with the unique ID.

Another advantage of the mobile payment system is that the customer does not have to obtain a specific device which carries payment credentials. Instead, a mobile device, NFC tags, NFC wearables, or a card carrying an optical machine readable code can be registered with the transaction server at any time, as described below, and subsequently they can be used to initiate financial transactions. This is a significant simplification as compared to the use of dedicated devices.

Further, the data exchange between the payment authentication mobile device and the mobile POS terminal is contactless and achieved via any device supporting a wireless interface such as NFC or RFID.

Financial transactions can be conducted when the mobile devices are brought in close proximity to each other. The data packet created by the message transaction exchange between the two mobile devices is sent to a remote transaction server for authentication and authorization, prior to forwarding it to the financial institution for payment processing and payment authorization.

Unlike current credit and debit card processing where the transaction authentication and authorization is conducted via the direct interaction of the physical card and the POS terminal, the present invention sends this information to a remote rules engine for authentication and authorization. One significant aspect of the invention is that the financial transaction is not sent directly from the POS terminal to the financial institution for payment processing, but instead the transaction is stored in the remote rules engine of the transaction server for the customer to decide if the transaction is to be forwarded or rejected.

For the rules engine to authenticate a transaction requires at least one parameter to uniquely identify the POS terminal, initiating the transaction, and the unique ID transmitted by the customer's mobile device. If authentication fails the transaction is failed immediately and no financial transaction is sent to the financial institution for processing.

Another significant aspect of the disclosed solution is that the customer is in control of the transaction authorization by entering their payment authorization code or PIN directly on their mobile device, which is then sent directly to the rules engine for validation. This action removes fraud related issues arise from entering PIN numbers directly onto the POS terminals, from which a third party can intercept them.

Whether a transaction will be PIN authenticated or not may also controlled by the customer and processed by the remote rules engine. The customer's mobile device provides direct access to the remote rule's engine, via 2G/3G or USSD networks for example, and allows for defining the transaction value threshold limits in real time. For instance a customer could set a transaction limit of $20 USD, indicating that a transaction below this value will not require PIN authentication and thus the payment transaction message will be sent directly to the financial institution for payment authorization. On the other hand, if a transaction for example is $21 USD, then the customer will need to enter their PIN using their mobile device for validation. At any time the customer can alter their transaction threshold allowing for full control and flexibility of their transaction authorization process.

During the software application installation phase, the customer or merchant must enter their personal and payment preferences, such as IBAN number or credit and debit card details along with their associated payment authorization code or PIN numbers. The rules engine uses this information to generate the financial transaction message to be sent to the financial institution for payment processing and authorization. To complete the activation process the subscriber's profile needs to be linked to their mobile device using their own mobile number (MSISDN). This guaranties that only the MSISDN owner can access the rules engine to authorize transactions.

The customer and merchant software applications that run on the mobile devices do not store any sensitive payment related information, like credit card numbers and PINs, as these are stored in the secure remote rules engine, further reducing the possibility of fraudulent usage.

Another embodiment of the invention provides customers the ability to link additional and multiple wireless devices, such as NFC tags, NFC wearables, or a card carrying an optical machine readable code, that can be used to initiate transactions. For example an associated NFC tag can initiate a contactless payment with a POS, and the financial transaction will be sent to the rules engine. If the transaction limit is below the preset threshold limit, the rules engine will authenticate and authorize the transaction, which will then be sent to the financial institution for processing. In the event the transaction threshold is exceeded, then the rules engine will send a PIN request message to the primary registered mobile device. In order for the wireless device or card to be used in this way, it must be registered at the rules engine in association with the primary registered mobile device. Another embodiment of the invention provides a mechanism for initiating electronic payment transactions in areas, or under conditions, without network access. For example, a customer can still purchase goods using their NFC wearable device without having their physical mobile device present, or their mobile device is inoperative or simply they may be out of network coverage.

Real time user authorization of an electronic transaction as described above allows for a high degree of payment security and fraud prevention. Alternatively or in addition, electronic payment security and fraud can be enhanced by the validation of location information for a given electronic transaction.

A user equipped with a mobile device can define the location areas where their mobile device is allowed to conduct electronic transactions. A transaction originating outside the predefined location area can be blocked.

Merchants equipped with a POS terminal can define the location areas where the POS terminal is allowed to operate. A transaction originating outside the predefined location area can be blocked.

Placing a mobile device and a POS terminal in the same location further enhances the validity of a transaction, wherein it is determined whether the location information of the POS terminal matches with the location information of the mobile terminal. A relative distance between a mobile terminal location and that of a POS device can be preset. Transactions with a location variance in excess of the allowed distance will deem the transaction invalid or fraudulent and the transaction will not be completed. For example, if a POS terminal and a mobile device have a location distance variance of greater than 500 meters, the transaction can be automatically declined, as the two devices are too far apart to conduct an up close "touch and pay" transaction. This transaction can further be flagged as fraud and start fraud prevention activities.

Fraudulent electronic transactions occur at times and places unknown to a user. The use of location information recorded during an electronic transaction, provides a positive confirmation of where and when a user has initiated their electronic transaction. Disputes of fraudulent cases now become much easier and quick to investigate and resolve.

Merchants can benefit for the use of location information. Merchants can define the location area where they can accept payments. Transactions outside their declared location will be rejected. In addition, during a fraudulent dispute, the location of the point of sale (POS) device matching the location of a user provides an indisputable proof that the transaction was conducted at the recorded location.

Users also benefit from the use of location information. In case a transaction made by a fraudulent user, employing a phone different from that of the valid user, will provide a location that is different from that of the valid user, that transaction will be rejected.

The location information is essential to supply-chain and distribution payments. Placing the location of the payment aids in closing the loop from the time a merchant delivery is dispatched till the time the item is delivered and payed at the consumer's premises. The location information confirms that payment was conducted at the place where goods were delivered.

The location information also enables the creation of enhanced payment services and user experience. A transaction made in a certain location can now be allowed or blocked based on user selection criteria. Furthermore, loyalty points and rewards can be awarded to users when paying at certain locations.

Location information can also enhance the user experience when conducting electronic transactions, Location can be used for example to identify the location of a paying party and determine if certain types of payments are allowed, or if loyalty rewards and loyalty points are applicable based on the user's location. A range of additional services can be customized based on the location for both users and merchants.

BRIEF DESCRIPTION OF THE DRAWINGS

While the appended claims set forth the features of the present invention with particularity, the invention and its advantages are best understood from the following detailed description taken in conjunction with the accompanying drawings, of which:

DETAILED DESCRIPTION OF THE INVENTION

100. This document describes a mobile payment system. The system described facilitates mobile payments from one party, e.g. a customer, to another, e.g. a merchant, via a communications network having at least one wireless link. In most implementations, the mobile payment method is used for purchasing customer goods and services, however it can also be used for anything else that relates to the exchange of money, funds, coupons or loyalty points between two parties.

Figure 1A:
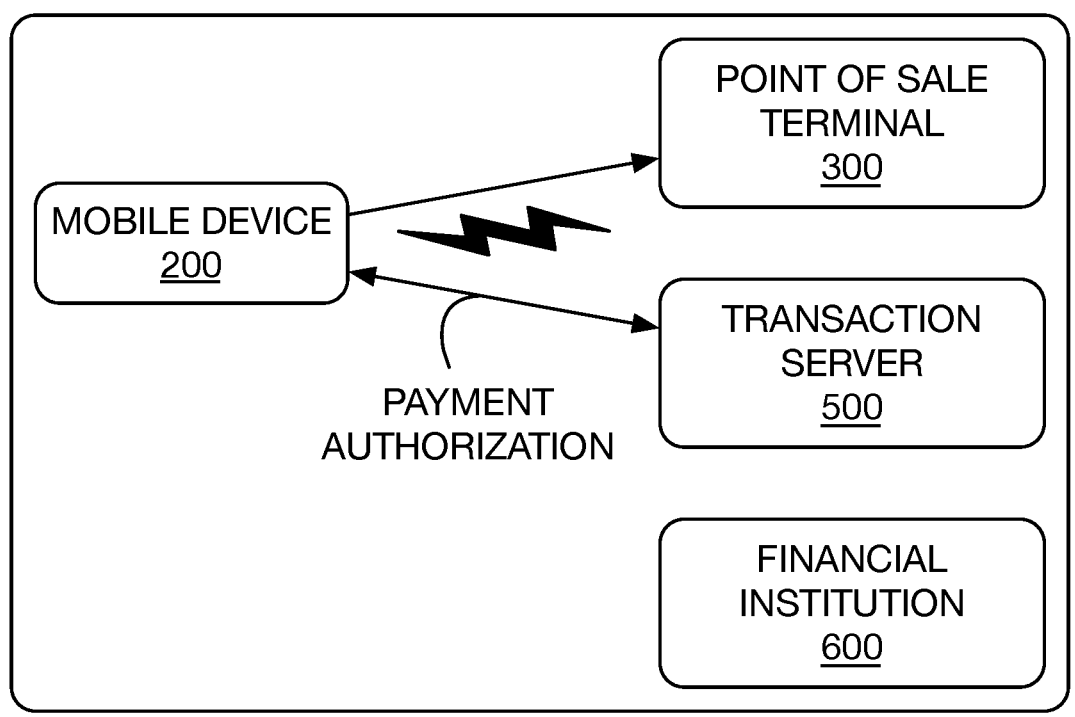
FIG. 1A illustrates one implementation of a block diagram of a mobile payment system including a mobile device, a POS terminal, a Transaction Server and a Financial institution.

101. FIG. 1A illustrates one implementation of a mobile payment system, which includes a mobile device 200, a point-of-sale terminal (POS) 300, a transaction server 500 and a financial institution 600. In one implementation a merchant enters a transaction amount on the POS terminal 300. When the customer mobile device 200 is brought in close proximity to the POS terminal 300, the payment transaction is automatically initiated.

102. In one implementation the POS 300 reads the mobile device identification (ID) 207 and location information via a close proximity wireless communication link, like a near field communication (NFC) or radio frequency identification (RFID) communication link. The mobile device ID 207 represent a unique ID associated with a customer. The POS 300 creates a financial transaction request message, which may include any of the following parameters, but not limited to, the mobile device ID 207 and its location information, the POS terminal ID 307 and its location information along with the amount of the transaction. POS terminal ID 307 represents POS terminal information. The POS 300 creates a secure connection to the transaction server 500 and forwards the financial transaction request message to the transaction server 500, without permanently storing any part of this message in the POS 300. The transaction server receives and validates the financial transaction request message. Once the transaction request is successfully validated, the transaction server 500 determines if personal information number (PIN) authorization is required for this financial transaction based on the customer's predefined rules. In the event PIN authorization is required, the transaction server 500 will communicate with the customer's mobile device 200 and wait for the customer to enter their authorization PIN on their mobile device 200. Once the transaction server receives the customer's authorization PIN, a payment authorization request message is created and forwarded to the financial institution for processing. The payment authorization message may include, but not limited to, a customer's financial account information, such as a bank account number or debit or credit card information stored in transaction server from which funds will be debited, the associated authorization PIN, and the merchant's financial account information and institution details, stored in the transaction server, where the funds will be credited. The transaction server sends the payment authorization results, received from the financial institution, to the mobile device 200 and to the POS terminal 300.

103. In another implementation the POS application 306 initiates a wireless communication link and communicates with the mobile application 206. The POS application 306 requests the location information of the mobile device 200. The mobile application 206 retrieves the location information of the mobile device 200 and sends it to the POS application 306. The POS application 306 also retrieves the location information of the POS device 300, and transmits both locations, that of the mobile device 200 and that of the POS device 300, along with the relative payment information to the transaction server 500.

104. The transaction server 500 receives the payment request with the corresponding location references. In one implementation the transaction server 500 will geo-authenticate a transaction based on the location preferences predefined in the transaction server 500 for the POS device 300. If the POS device 300 location is within the approved location area, the transaction server with geo-authenticate the transaction and proceed with any additional transaction validation checks. Failure of the location validation will result is the rejection of the payment transaction.

105. In another implementation the transaction server 500 will geo-authenticate a transaction based on the location preferences predefined in the transaction server 500 for the mobile device 200. If the mobile device 200 location is within the approved location area, the transaction server will geo-authenticate the transaction and proceed with any additional transaction validation checks. Depending on the validation rules established in the transaction server, failure of the location validation may result in the rejection of the payment transaction, or request for a PIN authentication from the consumer.

106. In yet another implementation the transaction server 500 will geo-authenticate a transaction based on the location proximity preferences predefined in the transaction server 500. If the location variance of the POS device 300 and that of the mobile device 200 location is within the approved variance, for example less than 10 meters, the transaction server will geo-authenticate the transaction and proceed with any additional transaction validation checks. Depending on the rules defined in the transaction server, a failure of the location proximity validation may result is the rejection of the payment transaction, or request for a PIN authentication from the consumer.

107. In yet another implementation, where the location information is not provided either by the mobile terminal 200 or the PUS device 300, the last known location information can be used. The location information stored in the transaction server 500 is updated regularly from the both the mobile application 206 and the POS application 306, as described in more detail below, via their direct communication with the transaction server 500. A payment transaction can be geo-authenticated for processing without a location information if the transaction is conducted within reasonable time interval from the last location update. For example, if a transaction is conducted 5 minutes after the last updated location, the transaction server can consider a missing location information as a temporary network or GPS error, and use the previous location recorded to geo-authenticate a transaction.

Figure 1B:
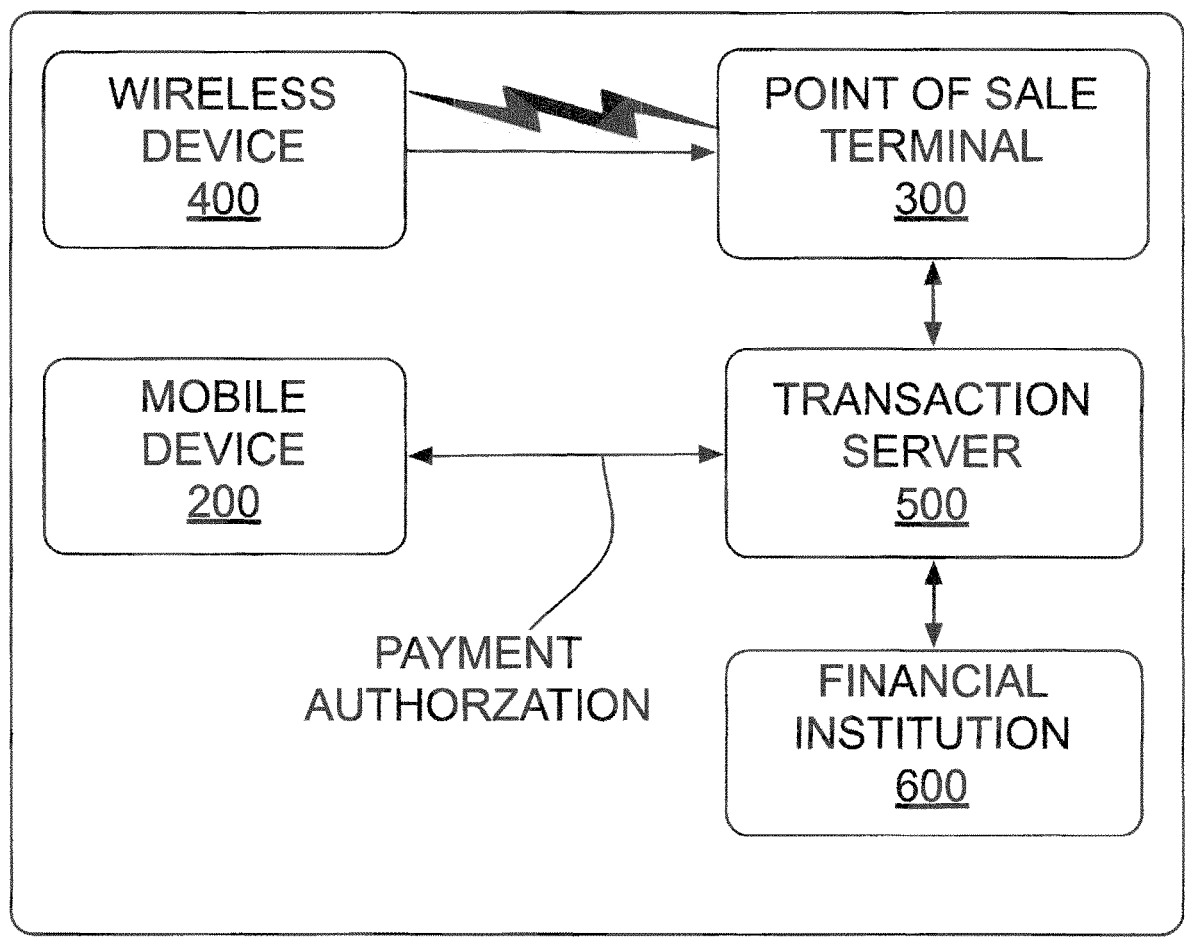
FIG. 1B illustrates one implementation of a block diagram of a mobile payment system including a wireless device, a mobile device, a POS device a Transaction Server and a Financial institution.

108. FIG. 1B illustrates one implementation of a mobile payment system, which includes a mobile device 200, a wireless device 400 a point-of-sale terminal (POS) 300, a transaction server 500 and a financial institution 600. The wireless device 400 may be integrated with the mobile device 200 or it may be separate from the mobile device 200. The wireless device 400 and the mobile device 200 together represent the mobile terminal of a customer. The wireless device 400 is not capable of providing location information. In one implementation, when the wireless device 400 is brought in close proximity to the POS terminal 300, the payment transaction is automatically initiated.

109. In one implementation a merchant enters a transaction amount on the POS 300. When the customer wireless device 400 is brought in close proximity to the POS terminal 300, the payment transaction is automatically initiated. The POS terminal 300 reads the wireless device ID 408 via a close proximity wireless interface like an NFC or RFID communication link. The wireless device ID 408 represent a unique ID associated with a customer. The POS 300 creates a financial transaction request message, which may include any of the following parameters, but not limited to, the wireless device ID 408, the POS ID 307 and its location information along with the amount of the transaction. The POS 300 creates a secure connection to the transaction server 500 and forwards the financial transaction request message to the transaction server 500, without permanently storing any part of this message in the POS 300. The transaction server receives and validates the financial transaction request message. Once the transaction request is successfully validated, the transaction server 500 determines if PIN authorization is required for this financial transaction based on the customer's predefined rules. In the event PIN authorization is required, the transaction server will communicate with the customer's mobile device 200 and wait for the customer to enter their authorization PIN on their mobile device 200. Once the transaction server receives the customer's authorization PIN, a payment authorization request message is created and forwarded to the financial institution for processing. The payment authorization message may include, but not limited to, a customer's financial account information, such as a bank account number or debit or credit card information stored in transaction server, from which funds will be debited, the associated authorization PIN, and the merchant's financial account information and institution details, stored in the transaction server, where the funds will be credited. The transaction server sends the payment authorization results, received from the financial institution, to the mobile device 200 and to the POS terminal 300.

110. In one implementation the POS application 306 will read the content of the memory storage 406 of the wireless device 400, and transmit the payment information with the POS terminal 300 location information to the transaction server 500. The transaction server 500 will use the preconfigured location information defined for the wireless device 400, and compare it with the location information of the POS device 300 to provide location authentication.

Figure 2:
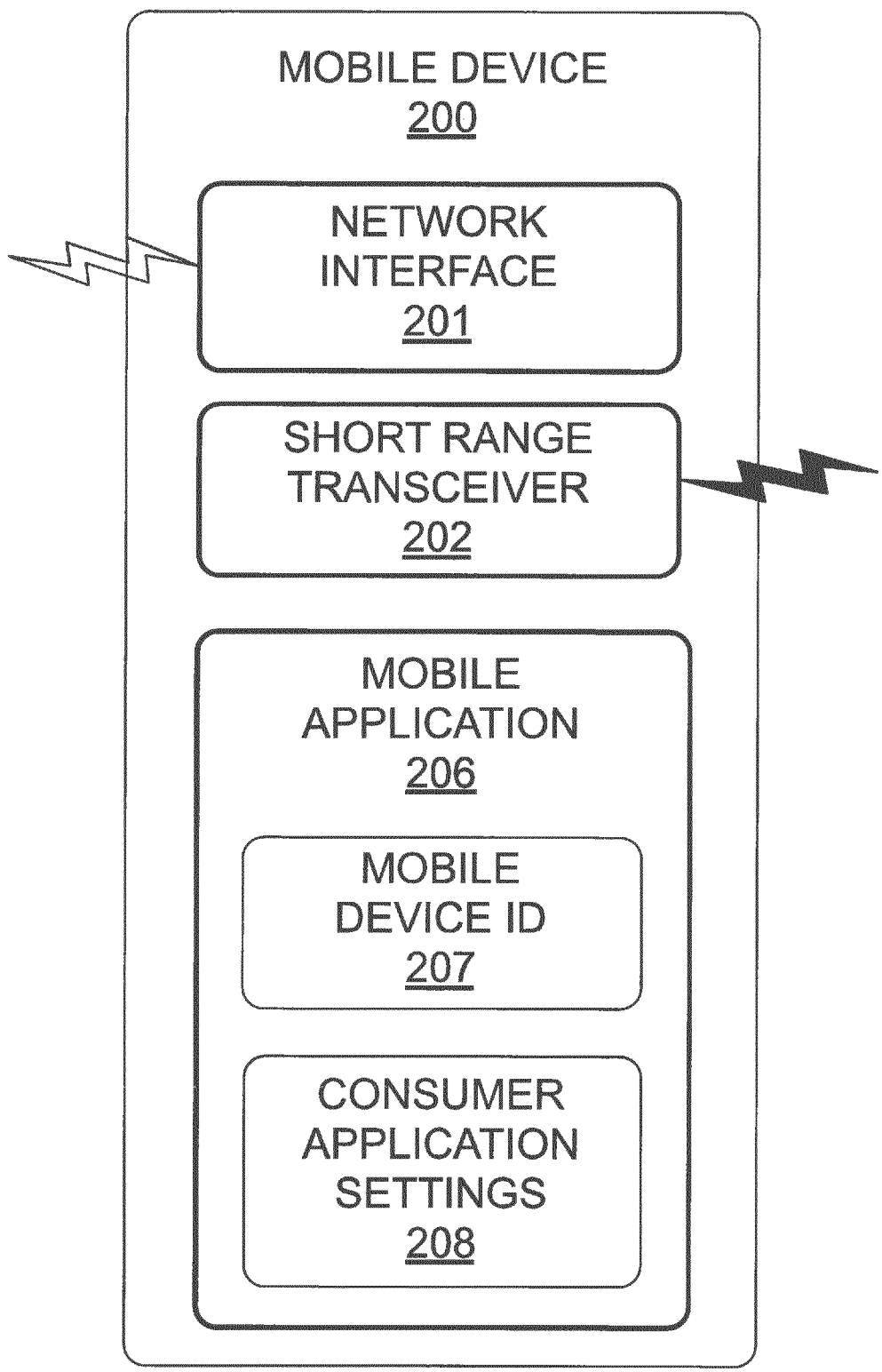
FIG. 2 is a schematic diagram of a mobile communication device of FIG. 1.

111. FIG. 2 illustrates one implementation of the mobile device 200. The mobile device 200 includes a mobile software application 206, controlling all data communications related to a financial transaction request, that (in one implementation) is installed and runs locally on the mobile device 200, a network interface 201 for connecting securely to the transaction server 500, and a short range transceiver 202 which can create a contactless communication link with a POS 300 device, when in close proximity to each other.

112. The network interface 201 can be any of the available communication standards supported by the mobile device 200, including but not limited to, USSD, GPRS, 3G, 4G, Bluetooth and WiFi standards. A typical customer mobile device 200 can be a mobile phone or tablet computer.

113. The short-range transceivers 202, in one implementation, is a contactless RFID device embedded in the mobile device 200. The software application 206 fully controls the transceiver 202 functions, from its operational status (on or off) to the data communication exchange with the POS terminal 300. In one implementation the transceiver 202 is an NFC device supporting any standard protocol such as NEC Type-1, Type-2, Type-3 and Type-4 tags.

114. The mobile application 206, in one implementation, is installed locally in the mobile device 200. The mobile application is discussed in greater detail below. A user can access the application once they successfully enter their application password, which is defined by the user during the initial setup of the application. A successful login to the application 206 allows, but not limiting, to authorize financial transaction requests, view transaction history and configure any available profile parameter. The software application fully controls the data exchange between the mobile device 200 and the transaction server 500 via the network interface 301, as well as the data exchange between the mobile device 200 and the POS 300 via the short-range transceiver 202.

Figure 3:
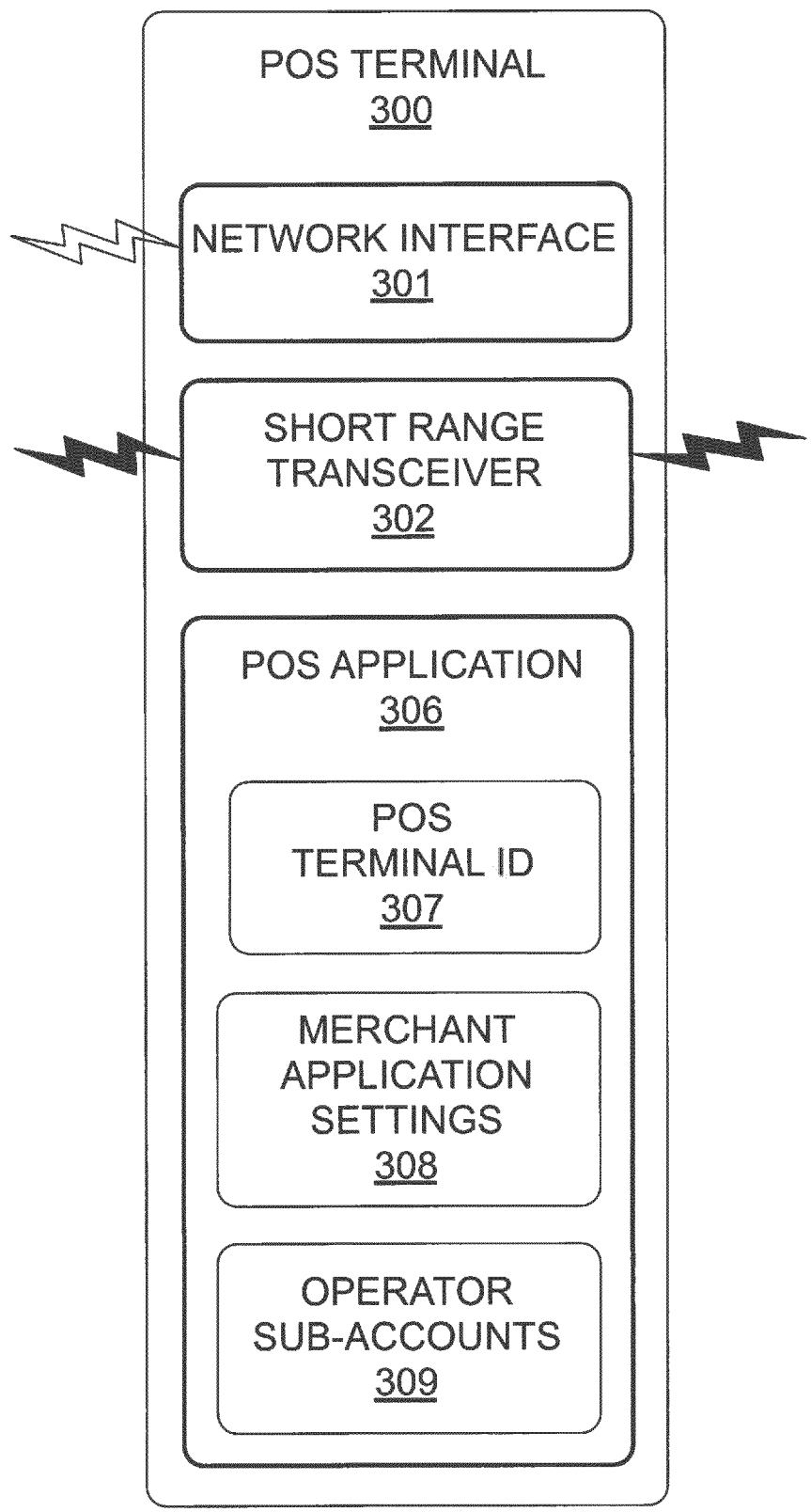
FIG. 3 is a schematic diagram of a point of sale device of FIG. 1.

115. FIG. 3 illustrates one implementation of the POS terminal 300. In one implementation the POS terminal 300 is physically identical to the mobile device 200, with the only difference being the software application installed on the device. The POS terminal 300 runs locally the POS application 306. The POS application 306 provides merchant related functions, which are different from that of a customer, and is explained in greater detail in the sections below.

116. In one implementation, the mobile application 206 and merchant application 306 can be installed in the same physical device. For example, launching the mobile application 206 will convert the device to a mobile payment device 200, whereas launching the POS application 306 will convert the device to a merchant POS terminal 300.

Figure 4:
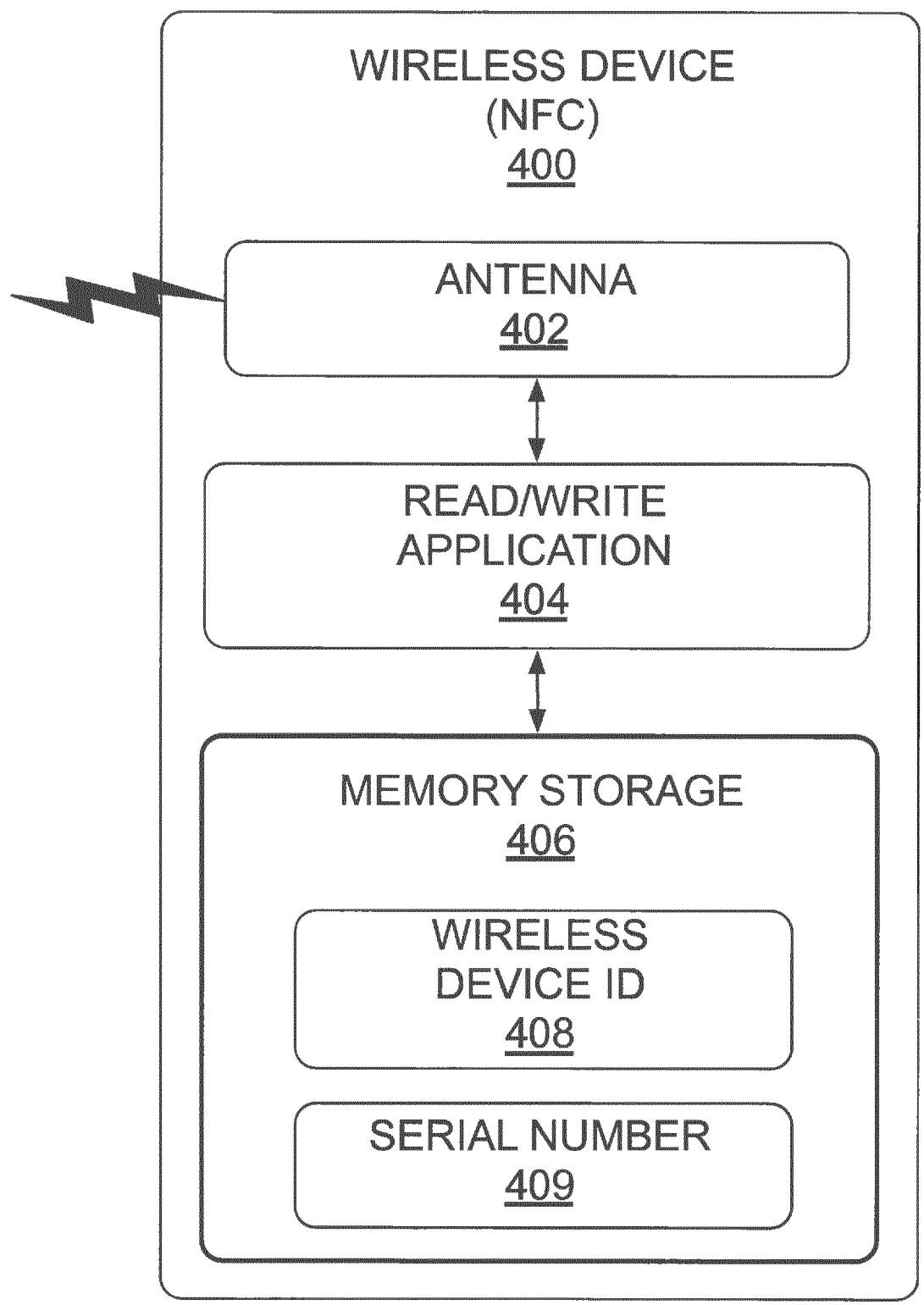
FIG. 4 is a schematic diagram of a customer wireless device.
Figure 9A:
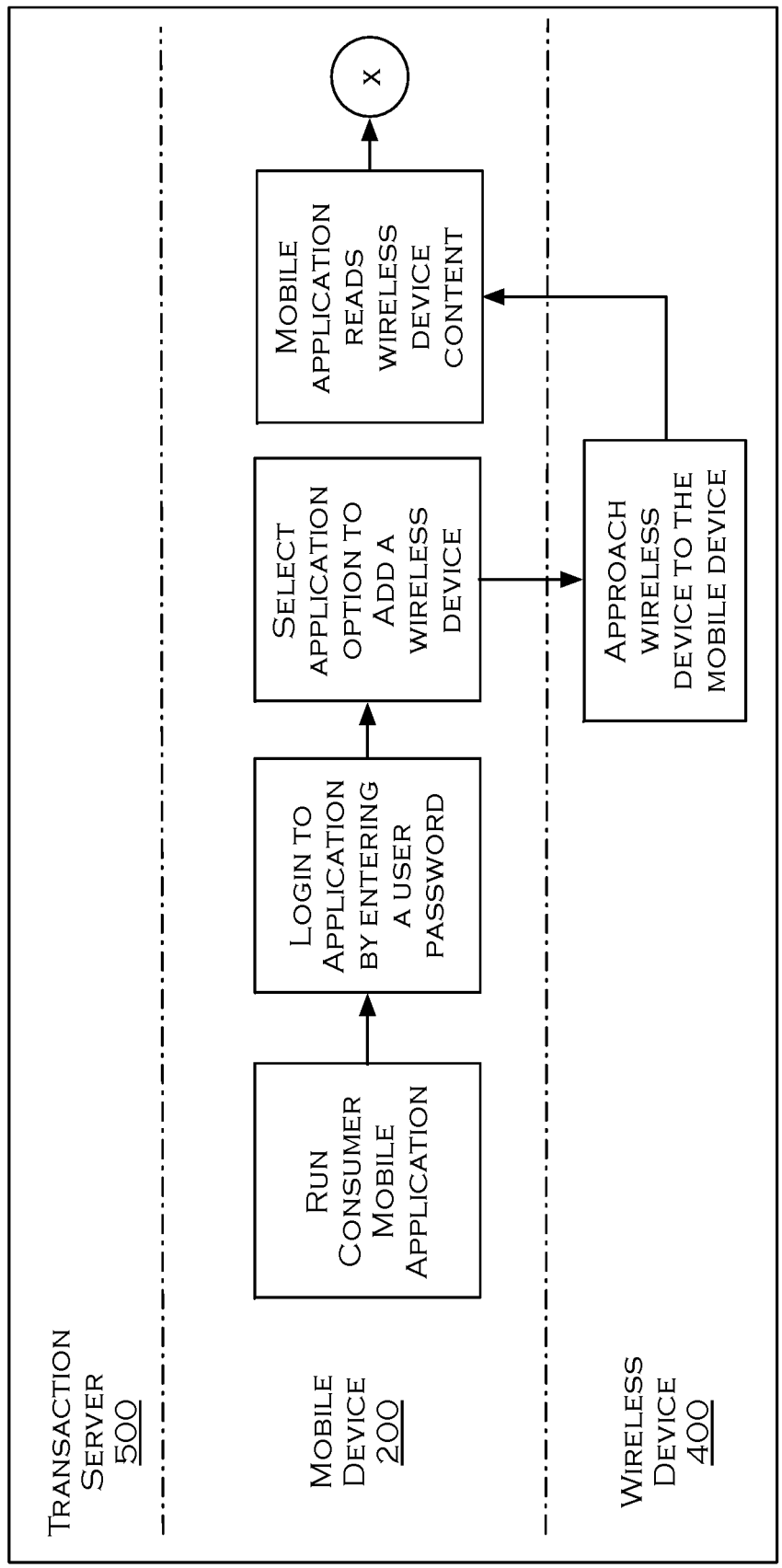
FIG. 9A-9B illustrates the steps to program a wireless device of FIG. 5 for use in a mobile payment system.
Figure 9A:
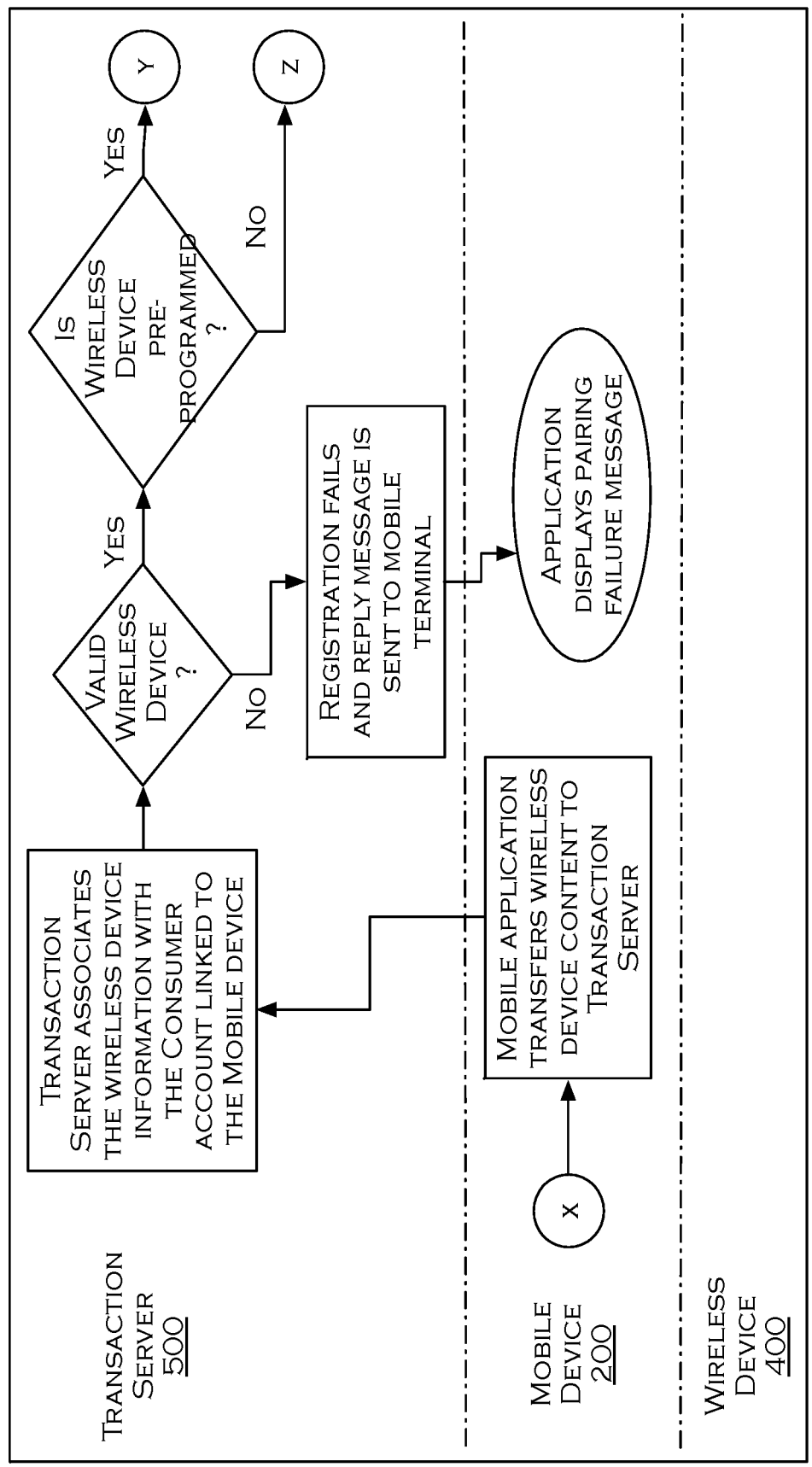
Figure 9A:
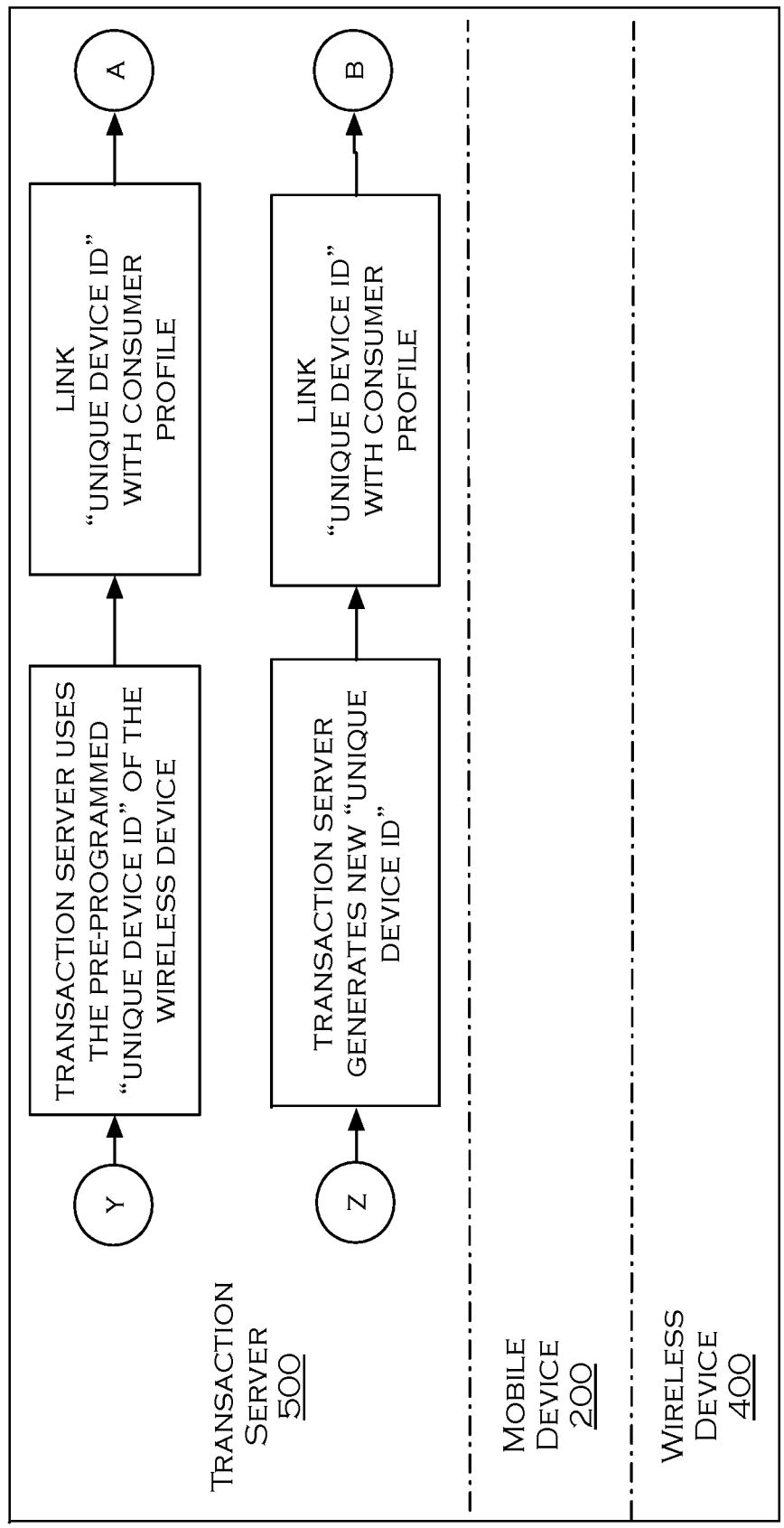
Figure 9B:
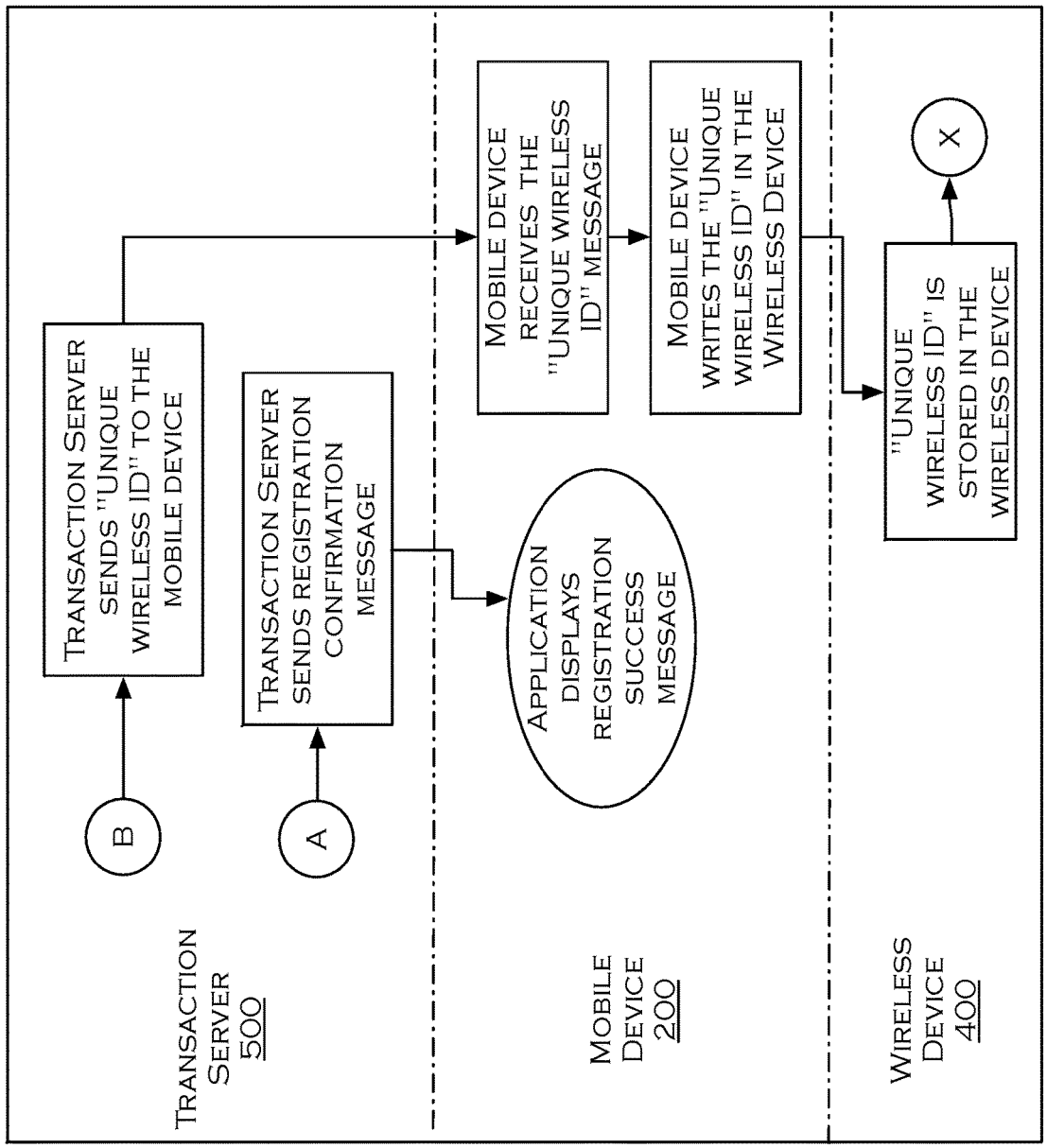
Figure 9B:
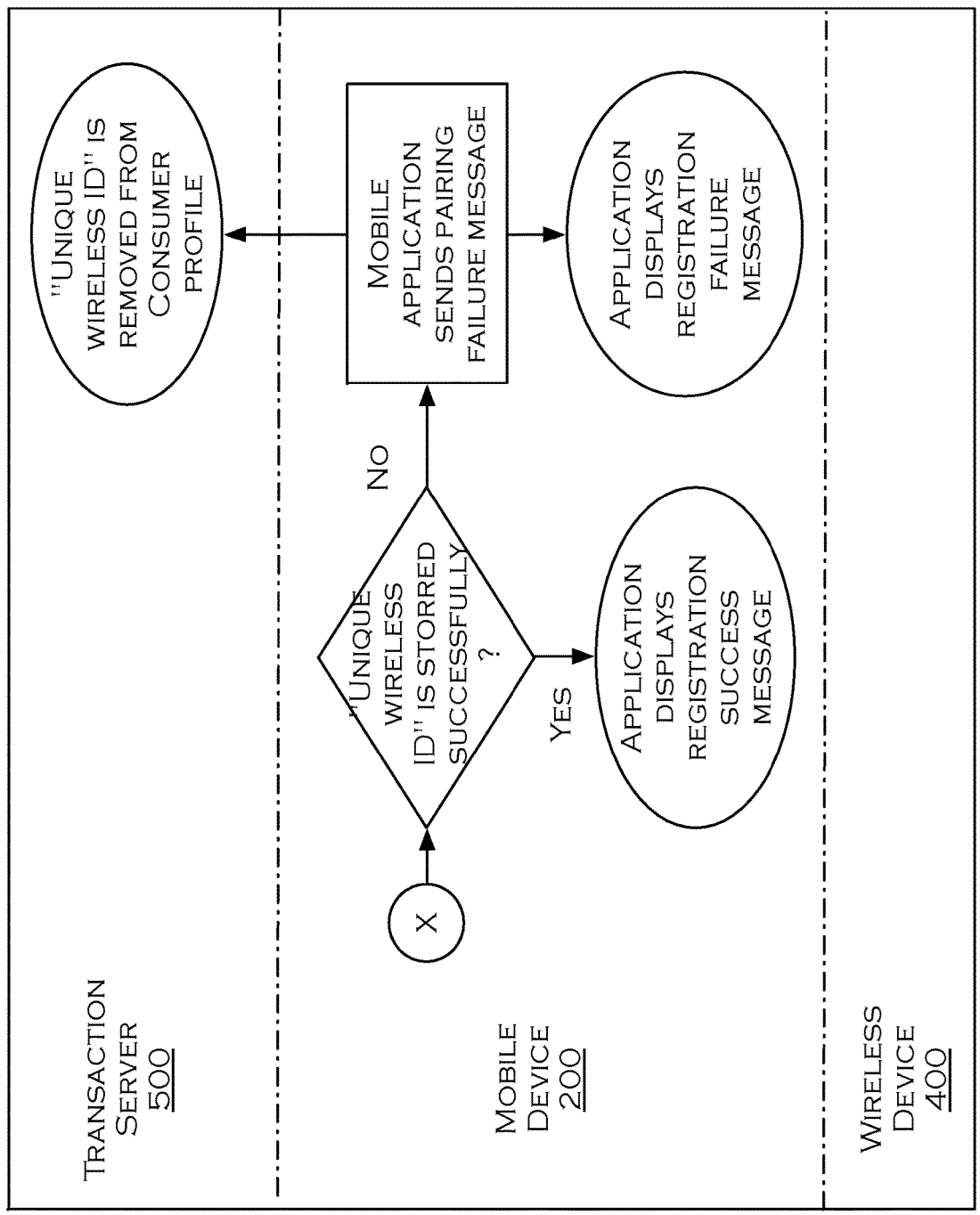

117. FIG. 4 illustrates one implementation of the wireless device 400 (NFC). In one implementation, the wireless device 400 is an NFC device, capable of executing proximity services, and can be of any NFC Type supported by the associated devices 200 and 300. The NFC device 400 must first be registered in the transaction server 500 and linked to a customer account. Each NFC device 400, registered in the transaction server 500, must be unique. In the event that the NFC 400 is not preconfigured with a unique ID, supplied by the transaction server 500, the transaction server 500 creates a wireless device Ill 408, during the device registration process, as described in detail in FIG. 9A-9B.

Figure 5:
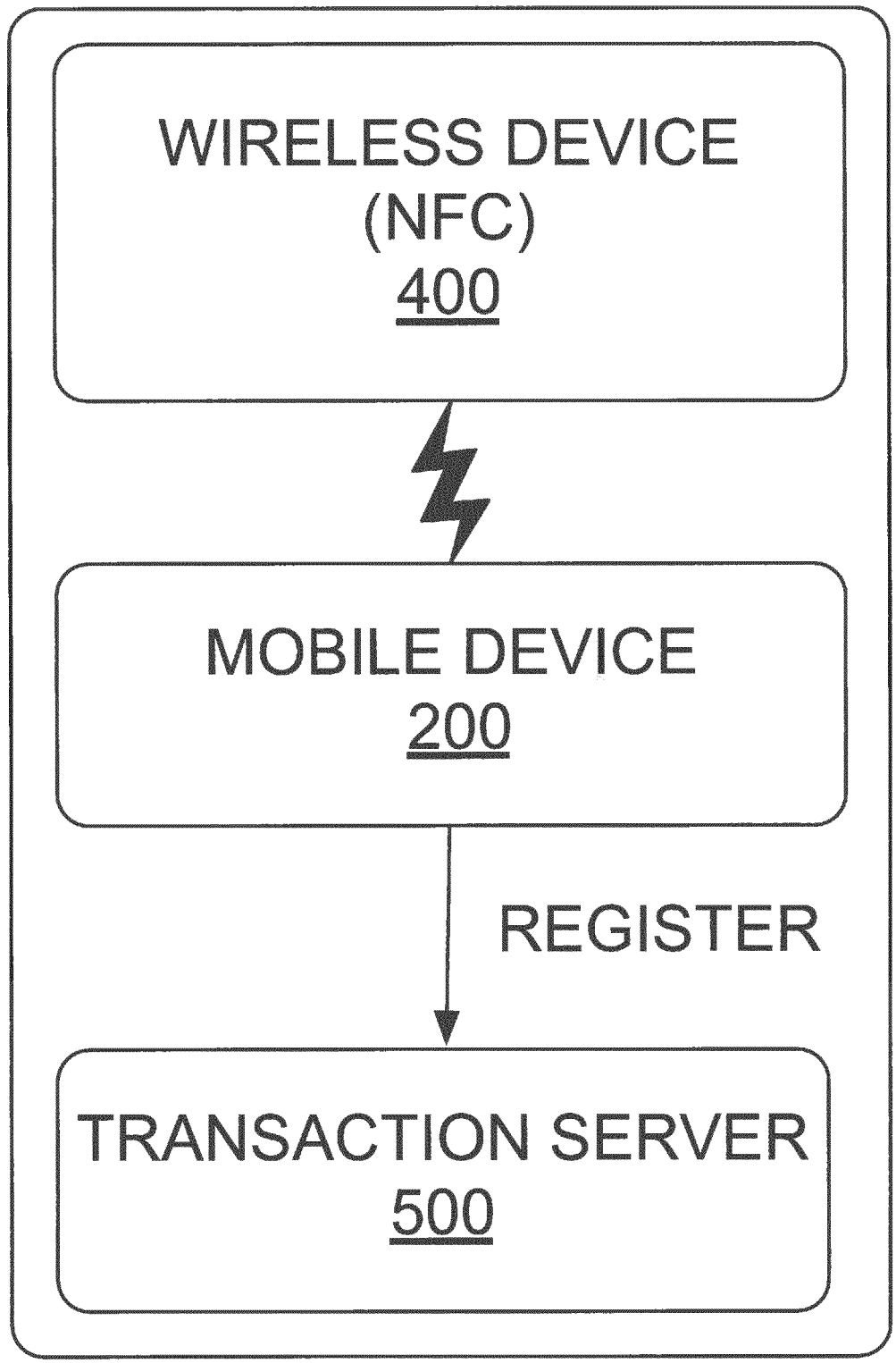
FIG. 5 illustrates one implementation of programming a wireless device for initiating and authorizing payment transactions.

118. FIG. 5 illustrates one implementation of a wireless device 400 registration process, via a customer mobile device 200. The detail steps of the process are described in FIG. 9A-9B. The mobile device 200 is assumed to be preconfigured and already running the mobile application 206. Selecting the application option for registering a new device, a screen message prompts you to touch the NFC device 400 near the antenna section of the short-range transceiver 202. Upon touching the NFC 400 device near the antenna area of the transceiver 202, the mobile application 206 reads the memory content of the wireless device 400 and transfers it to the transaction server 500. The transaction server 500 authenticates the memory content of the wireless device and checks for an existing wireless device ID 408. In the event the wireless device ID 408 is blank or empty, the transaction server generates a new wireless device ID 408 and links it to the customer account associated with the mobile device 200 initiating the request. The transaction server 500 encrypts the wireless device ID 408 and forwards it to the mobile device 200. The mobile application 206 proceeds with writing the encrypted wireless device ID 408 string to the non-volatile memory area 406 of the wireless device 400. In other embodiments, the wireless device ID may not be encrypted.

119. In another implementation the wireless device 400 registration process may be initiated via a POS terminal 300. In one implementation the POS application 306 requires the input of at least one unique customer identifier, including any combination of, but not limited to, the customer name, user name, mobile number or mobile device ID 207. When the wireless device 400 is brought into close proximity to the POS terminal 300, the POS terminal 300 will read the wireless device 400 content, and transmit the customer identifier and the wireless device 400 content to the transaction server 500. A pairing confirmation message is sent to the customer's mobile device 200. The customer can validate the paring request using their application password and upon successful confirmation, the POS terminal 300 programs the wireless device ID 408 in the wireless device 400, and the transaction server 500 links the wireless device ID 408 to the customer or consumer profile 524.

120. In another implementation the wireless device 400 may already be preconfigured with a wireless device ID 408. For example the wireless device ID 408 may be the serial number of the wireless device 400, created during the manufacturing process. This wireless device ID 408 can be registered in the transaction server 500, and linked to a specific mobile device 200 associated with a customer's account, via the user mobile application 206, a POS terminal 300, a web portal or any other back end process.

121. In another implementation the wireless device IDs 408 can be generated beforehand and stored in the transaction server 500. The same wireless device IDs 408 can be used to pre-program the wireless devices 400 during their manufacturing process. These wireless devices 400 can then be linked with a specific mobile device 200, associated with a customer's account, via the user mobile application 206, a POS terminal 300, a web portal or any other back end process.

122. Another embodiment uses a card carrying an optical machine readable code which represents a unique ID of a customer. The registration of the optical code is a different process than NFC registration, wherein the customer can register their optical code in the transaction server via their web interface. Specifically, the optical code can be transferred to the transaction server via a scanner and a special application which reads and loads the optical code into the transaction server, under a customer profile using a customer identifier including the telephone number of the customer's mobile terminal.

Figure 6:
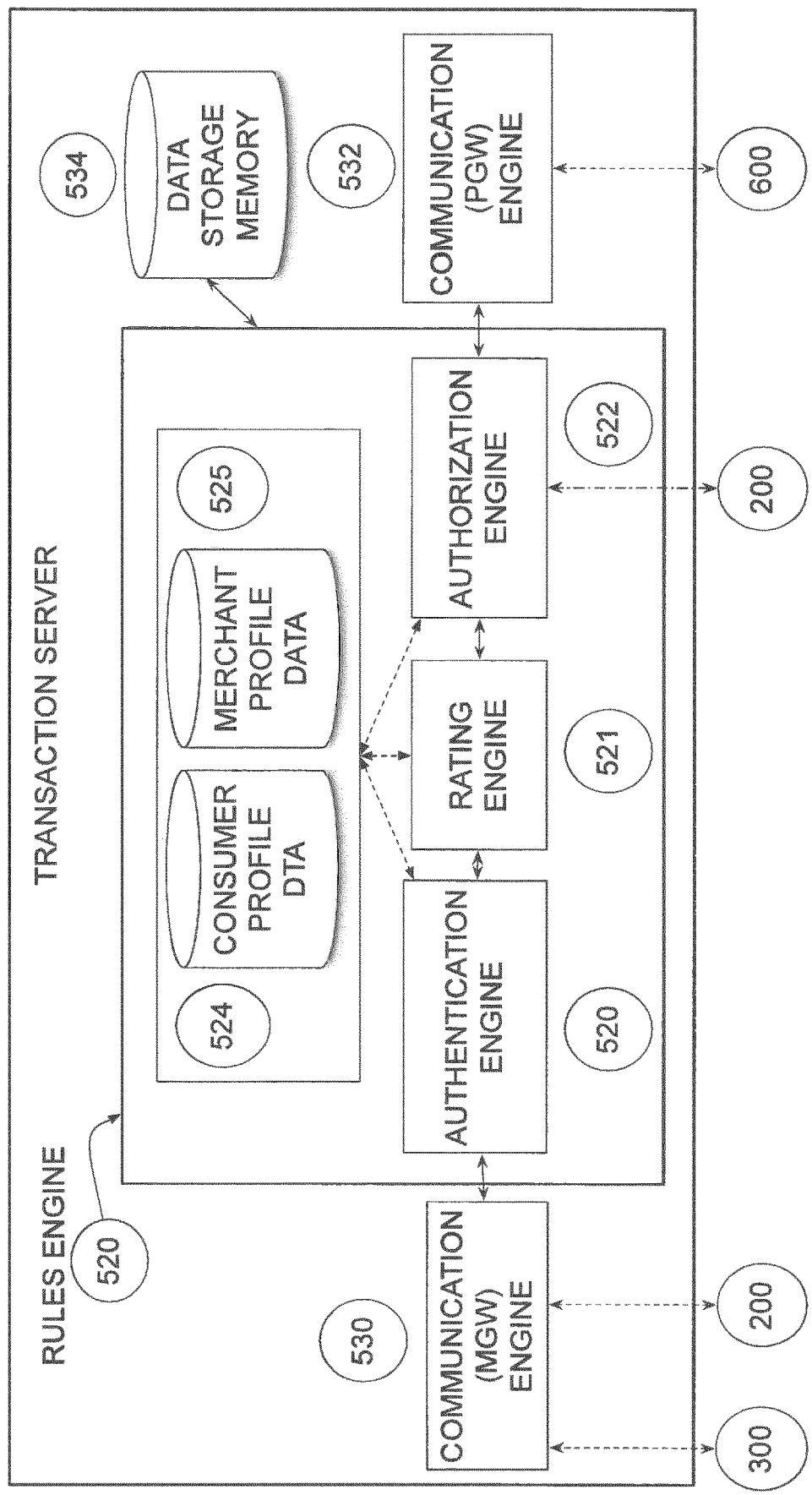
FIG. 6 is a block diagram of a transaction server suitable for receiving a financial transaction request, processing that request and forwarding the request to a financial institution for payment processing.

123. FIG. 6 illustrates one implementation of the transaction server 500. A financial transaction request, received by the transaction server, will pass through various processing stages of message validations and authorizations prior to forwarding a financial transaction request message to the financial institution 600.

124. The Communication mobile gateway (MGW) engine 530, in one implementation, creates a secure SSL communication link (e.g., HTTPS, Bluetooth, IR, USB, or other suitable protocol) with a POS 300. The communication interface can be any type of wired (e.g. USB, X.25, ISDN, TCP/IP), or wireless (e.g. 2G, 3G, 4G, Bluetooth or WiFi) communication link, through which the POS application 306 sends the financial transaction request to the transaction server 500. In another implementation a customer mobile device 200 connects directly with the MGW 530 and creates a direct communication channel with the transaction server 500, to authorize financial transactions, MGW 530 forwards the financial transaction request message, received from a POS 300, to the authentication engine 520.

125. Authentication engine 520 examines the content of the financial transaction message to determine the validity of its origin and its content. In one implementation, the financial transaction message includes the customer mobile device ID 207 and its location information (Latitude and Longitude), the merchant's POS terminal ID 307 and its location information (LAT & LONG) along with the amount of the transaction. The customer mobile device ID 207 will be checked against the customer profile information stored in the customer or consumer profile 524, and will determine if the customer is allowed to initiate the financial transaction based on a plurality of rules, including, but not limited to, the status of the customer's account (e.g. active, suspended, unknown etc.), the type of the transaction, the time and date of the transaction, the location information, the merchant type and the amount of the transaction. At the same time, the POS terminal ID 307 will be checked against the merchant profile information, stored in the merchant profile 525, to determine if the POS terminal ID 307 is allowed to initiate the transaction based on a plurality of rules, including, but not limited to, the status of the customer's account (e.g. active, suspended, unknown etc.), the type of the transaction, the time and date of the transaction, the location information, the merchant type and the amount of the transaction. In the event that one of the validation checks fail, the financial transaction is terminated and a failure message is returned to the POS terminal 300 which initiated the request. In the even that validation is successful, the financial transaction message is forwarded to the rating stage 521.

126. Rating engine 521 calculates any applicable service charges related to a transaction. As an example, a payment transaction of $100 USD may have a service charge cost of $1 USD for the merchant. In this scenario the customer's account will be debited $100 USD, and the merchant account will be credited $99 USD. A service charge rate varies based on a plurality of rules, including but not limited to, the type of transaction, amount of the transaction, the merchant type and the financial institution charge rates. The financial transaction message is the sent to the authorization engine 522 for further processing.

127. Authorization engine 522 determines when a financial transaction will be forwarded directly to the financial institution, and when a financial transaction message needs to be authorized by the customer who initiated the request, prior to forwarding it to the financial institution for payment authorization. The authorization process is based on a plurality of rules, including, but not limited to, the customer pre-authorized devices, enabled to initiate financial transactions, the amount of the transaction, the time and date of the transaction request and the location information. In the event a financial transaction request needs customer authorization, the transaction server creates a communication link with the customer's mobile device 200, and requests the customer to enter their PIN authorization code, while at the same time a pending authorization message is displayed at the POS terminal 300.

128. In one implementation the customer may use the PIN authorization code assigned by the financial institution. For example the PIN code may be that of an ATM card. In this case, the customer will enter their PIN code in their mobile device 200. The PIN code will be encrypted and transferred to the authorization engine 522. The authorization engine will decrypt the PIN code and insert it in the financial transaction message, which will be sent to the financial institution 600 for payment authorization.

129. In another implementation the customer may use a password, in place of the financial institution PIN code, which is associated with the customer's profile account. In this scenario is assumed that the financial transaction PIN code is stored in the customer profile data 524, during initial customer account setup. The customer will enter their password on their mobile device 200, and send it to the authorization engine 522. The password will be checked against the stored password in the customer or consumer's profile 524, and if it is valid, the system will retrieve the stored financial institution PIN authorization code. In case the password provided is not valid, then the authentication will fail and as result the financial transaction will also fail, and a failure notification message will be sent to both customer mobile device 200 and POS terminal 300.

130. The PIN authentication request has a time expiration limit, for example 30 seconds, during which the customer must enter their PIN authorization code. In the event the allowed time window expires, the transaction will fail, and a failure notification message will be sent to both customer mobile 200 and POS terminal 300.

131. Transaction Payment Gateway engine (PGW) 532 creates the financial transaction messages sent to the financial institution 600. Financial institutions use a variety of secure communication mechanisms and message exchange formats. The transaction engine creates the needed number of messages and content based on the financial institution specifications. In one implementation the financial transaction message may include, but not limited to, the customer financial institution account and its associated PIN code, the merchant financial institution account, and the financial transaction amount.

132. PGW 532 will create a secure communication link to the financial institution and forward the financial transaction message for payment authorization. PGW 532 will wait to receive a reply from the financial institution, with the results of the financial transaction message processing. Typically an agreed time delay for the response is agreed with the financial institution during which the financial institution needs to provide their reply to a financial transaction message received. In the event the time allowed window is exceeded, PGW 532 assumes the financial transaction has failed processing the request, and the overall transaction status is marked as failed. In the event the financial institution replies within the allowed time window, the message reply is checked for the payment status provided by the financial institution. The financial transaction is then marked, for example success or failed, as indicated in the transaction message body. PGW 532 will store the transaction detail record in the data storage 534, and MGW 530, will send a financial transaction confirmation message to both mobile device 200 and POS terminal 300.

133. Registered customers and merchants can access their accounts and settings online via a WEB Portal (not shown). The WEB portal is accessible via any computer device, connected to the Internet, by visiting the URL address of their portal (e.g. https://www.mepay.me/login), and entering their application username and password. Via the WEB portal, customers and merchants can access and edit their account settings and configure all of their account parameters available from the mobile device 200 or POS terminal 300. In addition the transaction history and map location display is also available from the WEB Portal.

Figure 7:
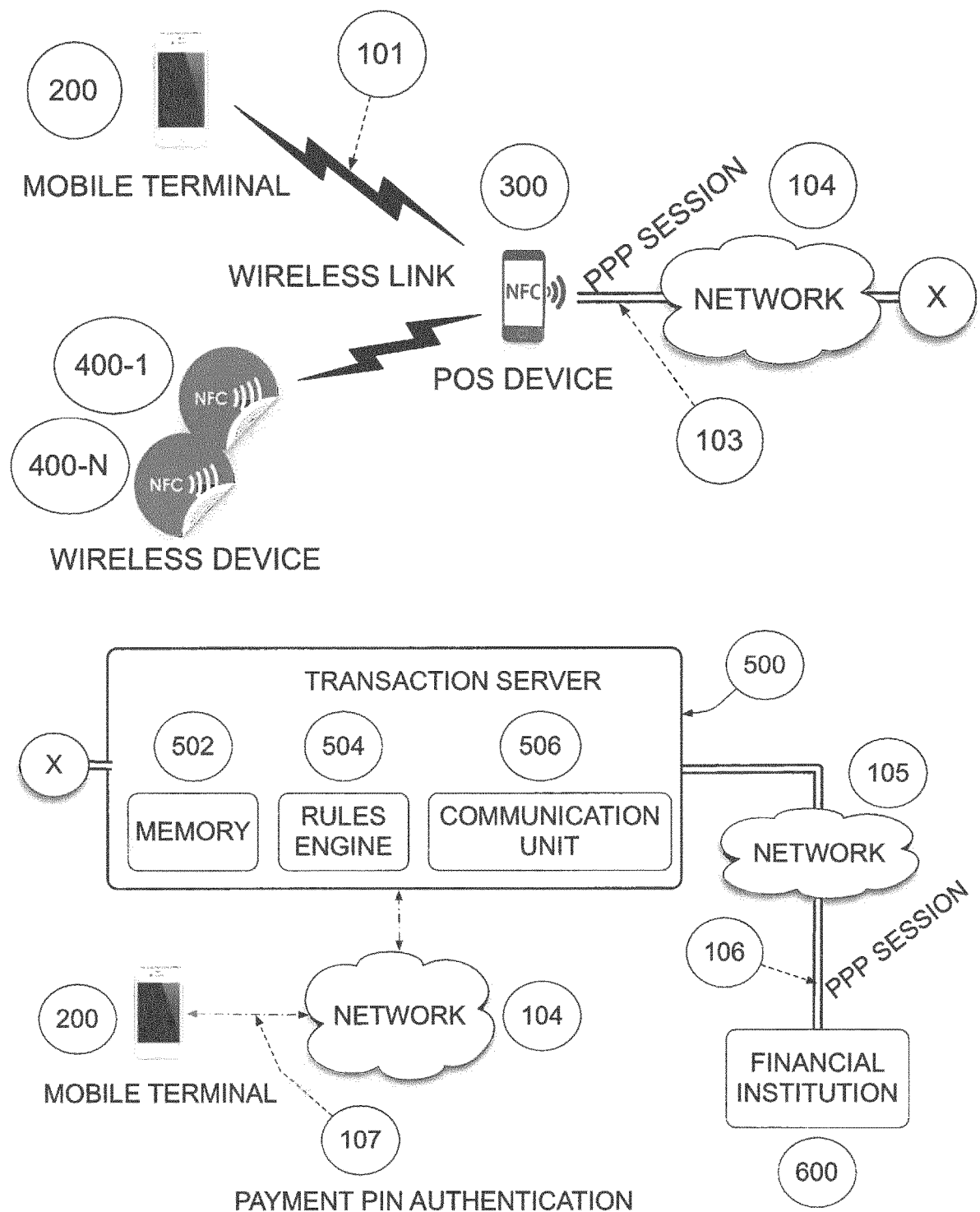
FIG. 7 illustrates a communication network of a mobile payment system including a mobile communication device, a wireless device, a POS terminal, a transaction server and a financial institution in accordance with one implementation.
Figure 8A:
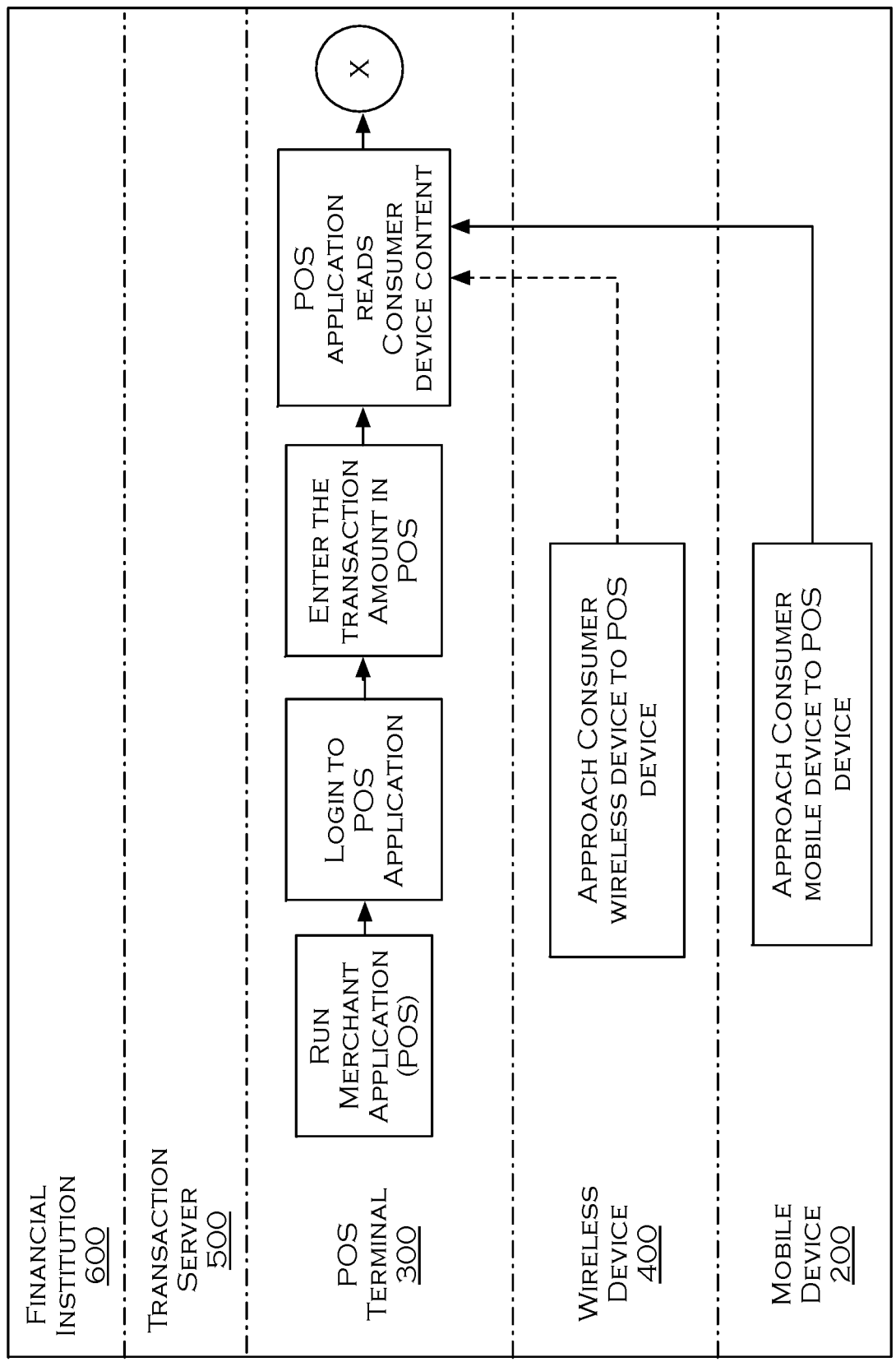
FIG. 8A-8B illustrates the steps of a mobile payment transaction in accordance with one implementation.
Figure 8A:
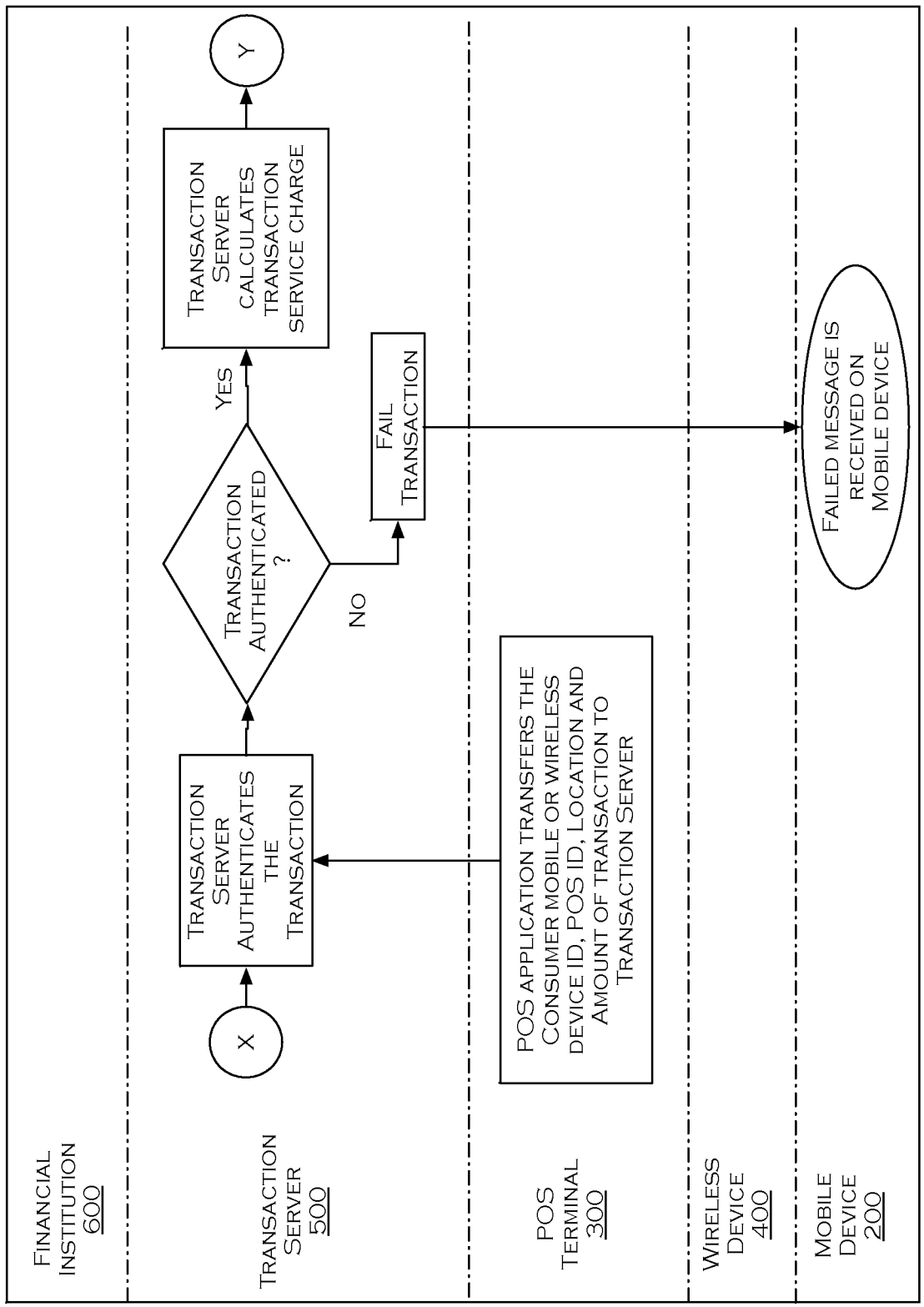
Figure 8A:
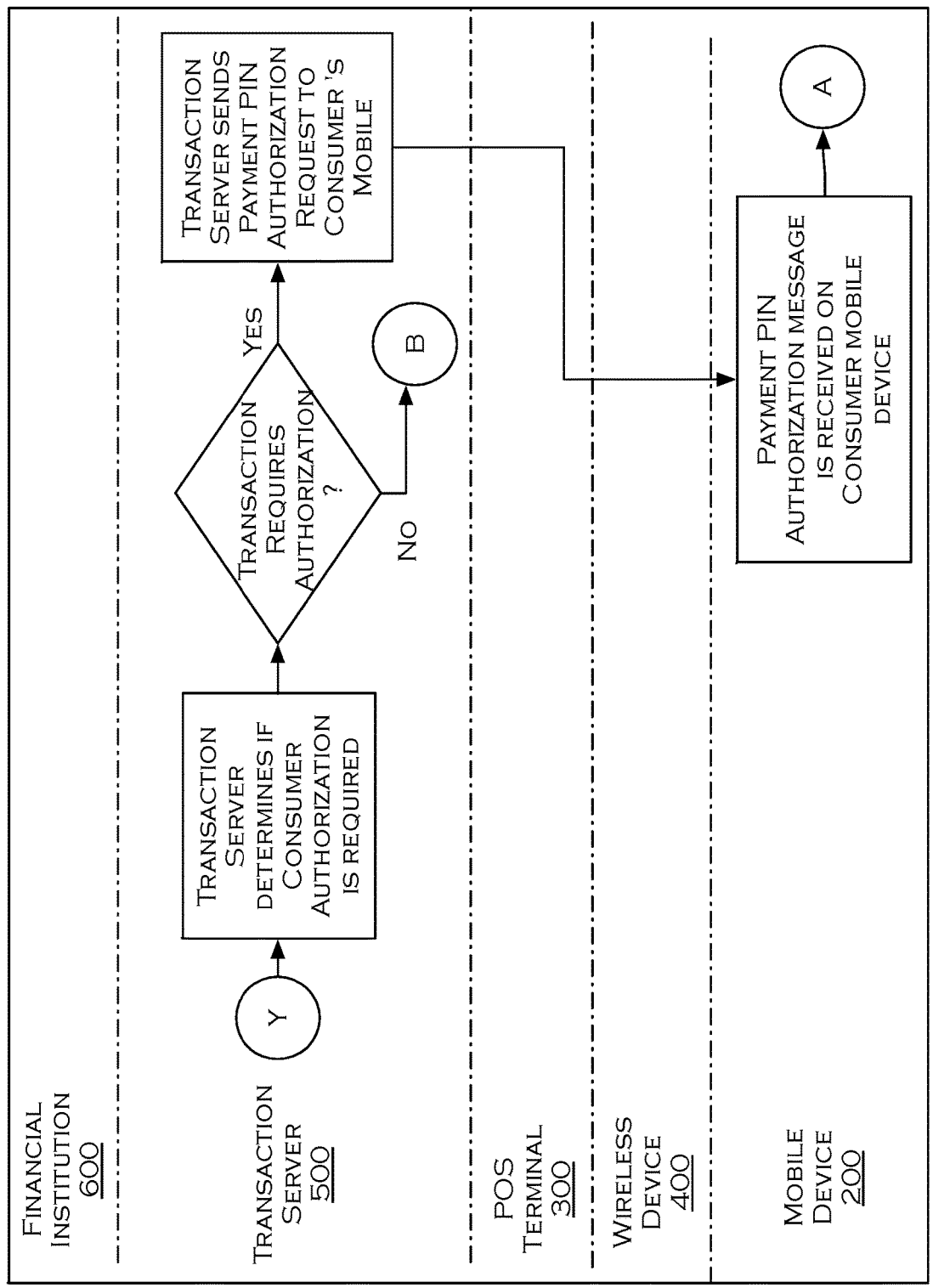
Figure 8B:
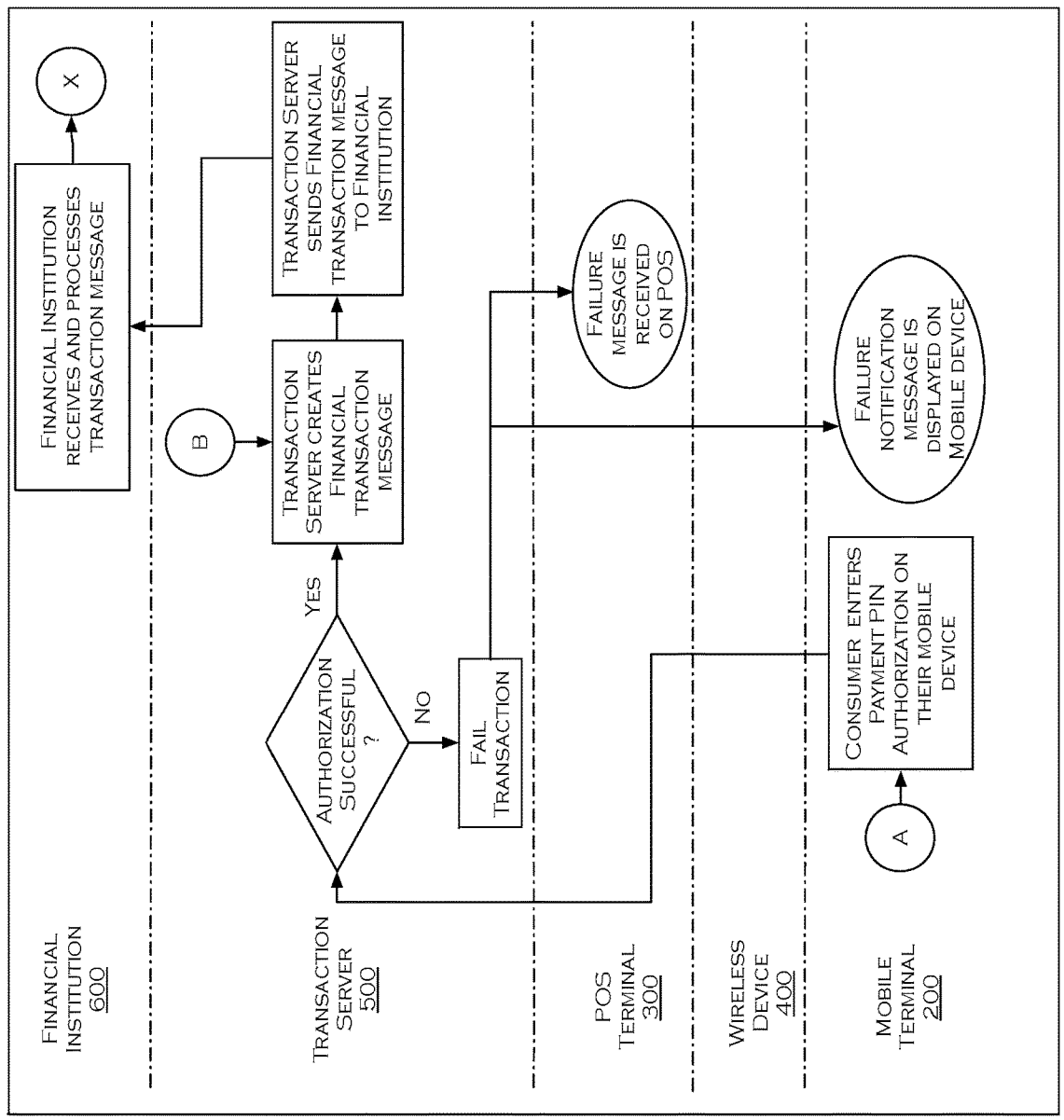
Figure 8B:
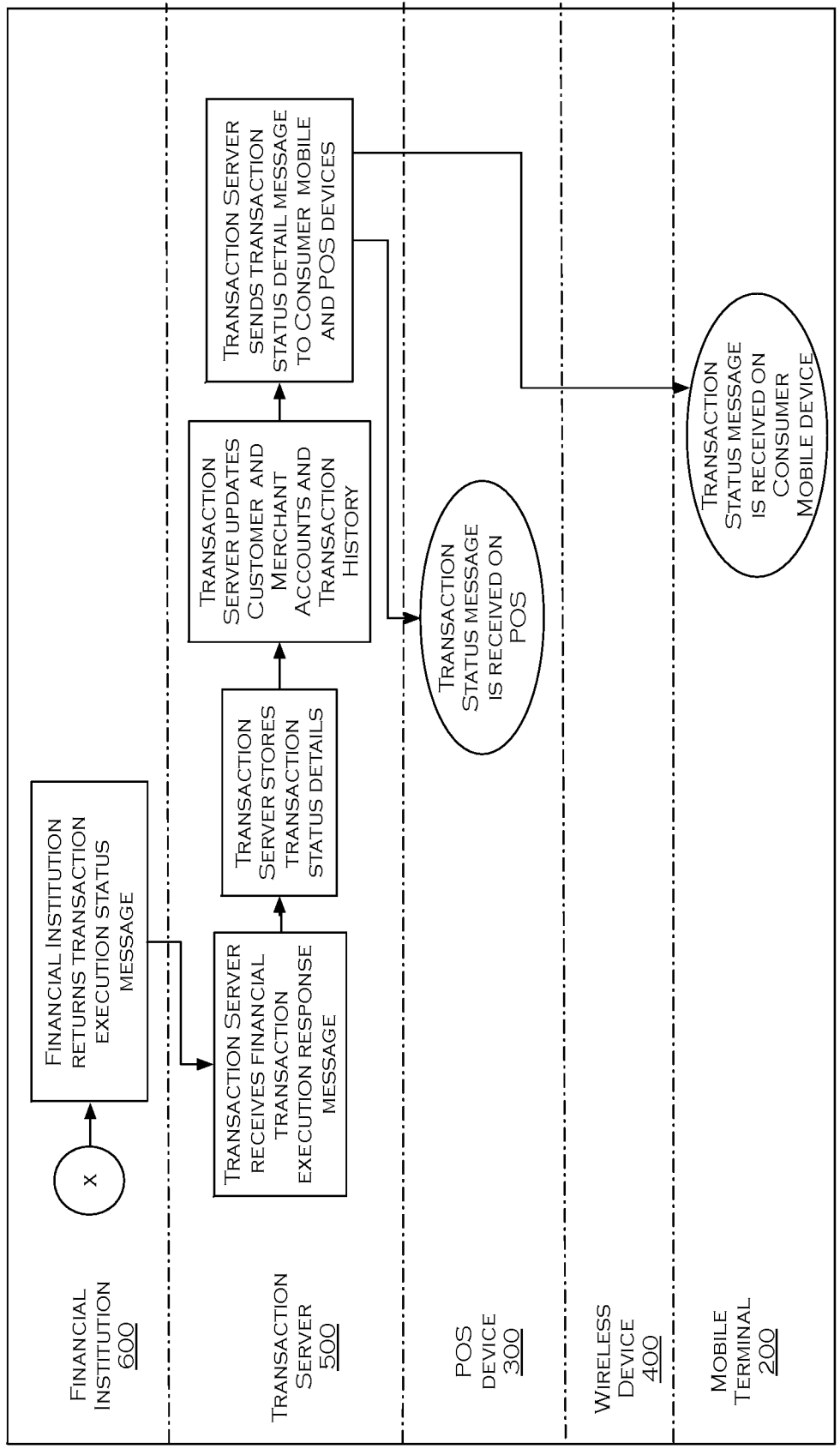

134. FIG. 7 illustrates one implementation of the communication network of a mobile payment system. In one implementation, it is assumed that a customer and merchant accounts have been preconfigured and a wireless device 400 has also been preconfigured for use with a customer's mobile device 200. Furthermore, a POS terminal 300 is able to create a wireless communication link 101 with the mobile device 200 and the wireless device 400. FIG. 8A-8B describes in more detail how a financial transaction request message is processed by the described mobile payment system.

135. In one implementation a customer initiates a financial transaction by bringing their mobile device 200 in close proximity to a POS terminal 300. In another implementation the financial transaction may be initiated by bringing a wireless device 400 in close proximity to a POS terminal 300. The POS terminal 300 creates a contactless communication link 101 with a mobile device 200 or with a wireless device 400 respectively.

136. The wireless communication link 101, supported by the contactless interfaces 202, 302 and 402, may include, but is not limited to, Near Field Communications (NFC), Radio Frequency Identification (RFID), Bluetooth, High speed Infrared (HSIR) or Infrared Data Association (IrDA, inductive interfaces, for example Radio Frequency Identification (RFID), Home Radio Frequency (RF) and Digital European Cordless Telecommunications (DECT).

137. A POS 300 forwards financial transaction requests, to the transaction server 500, via any Point-To-Point protocol (PPP) or Point-To-Point over Ethernet (PPPoE) protocol. In one implementation, the network 104 can be any type of wired or wireless network, including, but not limited to, 2G, 3G, 4G, WiFi, DSL, dial up or lease line.

138. The transaction server 500 receives and authenticates a financial transaction request message, checks for applicable service charges and determines if customer PIN authorization is required. In the event PIN authorization is required, the transaction server 500 will communicate with the customer's mobile device 200 to prompt the customer to enter their PIN authorization code.

139. In one implementation, the PIN authentication 107 request messages may be sent via a push notification service, similar to the one provided by Google. In this scenario, the PIN authentication request will be sent from the transaction server 500 to the Google server, and in turn the Google server will forward this request to the mobile device 200. The customer receives the PIN authentication request message with a prompt to accept or reject the transaction request. The customer can accept and authorize the financial transaction by login in to their application and entering their PIN authentication code. The PIN authentication code will in turn be encrypted by the application and securely sent directly to the transaction server 500 for further processing.

140. In another implementation, the PIN authentication 107 request message may be sent as an Over the Air (OTA) message, from the transaction server 500, via an OTA server (not shown). The OTA server has the ability to create secure USSD communications with mobile devices 200 via mobile networks. In this case an OTA message window will appear on the mobile device 200, displaying the PIN authentication request message, along with the option to reply, without invoking the mobile application 206. When a customer selects the reply option, a screen menu appears, on the mobile device screen 200, to enter the PIN authentication code. The entered PIN authentication code is then securely transferred to the OTA server and then forwarded to the transaction server 500 for further processing.

141. In yet another implementation, the transaction server 500 can send a PIN authentication 107 request message to the mobile device 200 via short message service (SMS). In this scenario, the SMS will be sent to the mobile number registered in the customer's profile 524. The customer will need to login to their application and enter their PIN authentication code to authorize a financial transaction.

142. PIN authenticated and pre-authorized financial transaction requests will be forwarded to the financial institution 600 for payment authorization. Each financial institution 600 has their own connection security standards for exchanging information with $3^{rd}$ party systems. The transaction server 500 will connect securely to the financial institution 600, via any available PPP or PPPoE 106 supported communication and encryption protocol. The network 105 is typically a private and secure network.

Mobile Application
Application Installation & Configuration

143. In one implementation, the mobile application 206 is downloaded and installed in the mobile device 200 from any available online service, for example Google play, Apple store, or any other device, which can be locally connected to the mobile device 200. Typical devices supporting the mobile application 206 include, but not limited to, smart phones and tablets.

144. During the initial software installation phase, the customer is prompted to enter their desired application user name and password to enable secure access to the mobile application 206. In one implementation, the mobile application 206 initiates a secure communication with the transaction server 500 and stores, in the consumer profile 524, relevant customer authentication details, including any combination of, but not limited to, the application user-name, password and mobile device ID 207. In another implementation, the user name and password are encrypted by the mobile application 206, and stored locally on the mobile device 200. The mobile ID 207 is a unique identifier of a mobile device 200, created by any combination of, but not limited to, a mobile device IMEI, MAC address, serial number and a software-generated serial number.

145. The mobile application 206 requires personal customer information to perform various accounting and reporting functions. In one implementation, the personal information required can include, but not limited to, the customer's first and last name, their address and the phone number of their mobile device 200. The personal customer information captured is then forwarded to the transaction server 500, and securely stored in the customer or consumer profile 524.

146. The mobile application 206 also requires the registration of at least one financial institution, which will be used during financial transactions. In one implementation, the financial institution account details may include, but not limited to, account holder's name, financial institution name, account number, mobile phone number and transaction authentication PIN. The financial institution account information captured is then forwarded to the transaction server 500, and securely stored in the consumer profile 524.

147. In one implementation, the mobile application 206 installed in the mobile device 200, through the use of an algorithm, transmits the location information of the mobile device 200 to the transaction server 500 at regular intervals. The algorithm analyzes various elements to determine when the location needs to be updated in the transaction server 500. In one implementation the algorithm senses the moving speed of the mobile device 200 to alter the frequency of the location update to the transaction server 500. For example, a slower moving mobile device will update its location less frequently where at higher speeds the location is updated more frequently. In another implementation the transaction server can query the mobile device 200 and retrieve its location information. For example, if the location has not been updated for a predefined time period, the transaction server 500 will query the mobile device 200 in order to retrieve its current location information. The transaction server 500 holds the most current location information of the mobile device 200.

148. The mobile application 206 allows to configure approved locations where mobile transactions initiated from within these location areas are allowed to be successfully processed by the transaction server 500. In one implementation a radius from a fixed location point can define the location area. In another implementation several smaller location areas can be combined to define a larger approved location area. The approved location areas are transmitted and stored in the transaction server 500. Mobile transactions initiated within these approved location areas are allowed for processing by the transaction server 500, while transactions initiated outside the approved locations will be rejected from the transaction server 500.

149. The mobile application 206 can register location of a wireless device 400. In one implementation, when the mobile device 200 is in close proximity to a wireless device 400, it reads the unique identification parameters of the wireless device 400 and in turn transmits this information along with the location information provided by the mobile device 200 to the transaction server 500. The location of the wireless device 400 is stored in the transaction server 500. In another implementation the location of a wireless device 400 can be stored directly in the transaction server 500 via an access portal, like a web portal.

Application Services

150. The mobile application 206 provides a menu with options to add, delete or edit any aspect of the available configurable parameters. For example, the customer options may include, but not limited to, the configuration of wireless devices, financial institution transaction settings, and customer personal information.

151. The present invention describes a mobile payment transaction between a customer and a merchant. In alternate implementations, the transaction server can facilitate any other type of financial transaction between two parties, for example B2B, B2C and C2C financial transactions. In one implementation, a customer or merchant may send an invoice directly to another customer or merchant requesting payment. In another implementation a merchant or customer can transfer funds directly to another merchant or customer, registered in the transaction server. Similarly, any other conceivable financial transaction between two parties, registered in the transaction server, can be facilitated.

Authorized Devices

152. The mobile application 206 enables the customer to pre-define which wireless devices 400 can be used for initiating financial transactions. The application allows the customer to add new devices, edit device parameters or remove existing devices. In one implementation, the mobile application 206 is installed on a mobile device 200 equipped with a short-range transceiver 202. In this scenario the customer can add new wireless devices 400 to their consumer profile 524, simply by bringing the wireless device in close proximity to their mobile device 200. The application will automatically program and link the wireless device 400 with the consumer profile 524. In yet another implementation, a wireless device 400 may be re-programmed following the same procedure as when adding a new wireless device 400. This is particularly helpful in cases where a wireless device may have been cloned, and a new unique wireless device ID 408 needs to be programmed. Authorized wireless devices 400 can be blocked or deleted from the application menu, as to avoid fraudulent usage, and enhance financial transaction security.

Pre-Authorized Transactions

153. Pre-authorized financial transactions are transactions forwarded directly to the financial institution 600, from the transaction server 500, without the need from a customer to enter their PIN authentication on their mobile device 200. In one implementation, a customer can predefine financial transaction limit thresholds, where a financial transaction not exceeding these limits will be authenticated and pre-authorized by the transaction server, and the transaction is forwarded to the financial institution directly. In one implementation, the financial transaction message wilt be populated with the PIN code stored in the consumer's profile 524. This feature is especially useful when a customer is conducting financial transaction payments, using their wireless device 400, while their mobile device 200 is inaccessible or in areas where the mobile device 200 cannot communicate with the transaction server 500.

Financial Transaction Value Limits

154. In one implementation, the mobile application 206 allows a customer to configure the maximum financial transaction value, to be initiated by the authorized devices. In one implementation, a customer can set a limit for the total transaction value allowed within a period of time. Every transaction exceeding the total value allowed will require customer PIN authentication. For example, a customer may define a daily transaction limit of $100 USD. Let us also assume that five (5) consecutive transactions, each of $20 USD value, are made. In this scenario, the 5 transactions will be treated as pre-authorized transactions. Any additional transaction request, will exceed the $100 USD limit, and will require customer PIN authentication.

155. In another implementation a customer can setup a maximum transaction value limit for each individual transaction initiated by an authorized device. In addition, a different value limit can be configured for each of the authorized devices. For example, a mobile device 200 may be set to a $50 USD maximum transaction value, while a wireless device 400 may be set to $20 USD. Any transaction not exceeding these maximum transactions values is considered a pre-authorized transaction, while a transaction exceeding these maximum limits requires customer PIN authentication.

Pre-Authorized Locations

156. In one implementation, a customer is able to define location areas for enabling pre-authorized transactions. In one implementation a customer may define a geographical location from a preset of location area options provided by the application. Such location areas may include, but not limited to, country, state or city. Multiple location areas can be added to form a wider location area. In another implementation, the location area can be defined as a radius, referenced from a fixed location point. In one implementation the customer may define the radius in meters from their current position. In yet another implementation a customer may define pre-authorized transactions based on merchant types as provided by the application.

157. The combination of pre-authorized location areas and merchant types enhances the customer financial transaction experience and improves financial transaction security. For example a customer inside a pre-authorized location area, initiating a financial transaction from a pre-authorized merchant, can initiate a pre-authorized transaction without the need to carry their mobile device or the need to enter their financial transaction PIN code.

Transaction History

158. The mobile application displays all of the financial transaction history. In one implementation, the transaction history may be sorted by predefined patterns, including but not limited to, date, transaction type, transaction value and location. In another implementation, the transaction history includes a map link to display the location of the financial transaction selected. Upon selection of the map option, a new application window is loaded, and a visual display of the transaction location is identified in the map. The map viewing option is particularly helpful for a customer to determine the validity of a transaction, and to refresh their memory of when and where a financial transaction took place.

Session Timeout

159. In one implementation, the mobile application shuts down after a period of inactivity. In one implementation, the inactivity period is adjustable from 30 seconds to 10 minutes. Additional tasks that can be associated with the shutdown procedure can include, but is not limited to, temporarily shutting down the short-range transceiver 202, to avoid fraudulent initiated wireless financial transactions.

Merchant Application

Application Installation & Configuration

160. The POS application 306 and installation is similar to the mobile application 206 described above. The POS application 306, menu and options however are different. In one implementation, the present invention describes a POS terminal 300, which works only with compatible mobile devices 200 and wireless devices 400.

161. In another implementation, a typical POS terminal, already supporting for example Master Card and Visa cards, can be modified to also support financial transactions from mobile devices 200 and wireless devices 400. In this scenario, the POS application is installed in the standard POS terminal, and is made capable of initiating transactions via its NFC wireless interface.

162. During the initial software installation phase, the merchant is prompted to enter their desired application user name and password to enable secure access to the POS application 306. In one implementation, the merchant application 306 initiates a secure communication with the transaction server 500 and stores, in the merchant profile 525, relevant merchant authentication details, including any combination of, but not limited to, the application user-name, password and POS terminal ID 307. In another implementation, the user name and password are encrypted by the merchant application 306, and stored locally on the POS terminal 300. The POS terminal ID 307 is a unique identifier of a POS terminal 300, created by any combination of, but not limited to, a POS terminal IMEI, MAC address, serial number and a software-generated serial number.

163. The merchant application 306 requires personal and business related information to perform various accounting and reporting functions. In one implementation, the personal and business related information required can include, but not limited to, the merchant's first and last name, their address the merchant type and the phone number of their POS terminal 300. The personal and business information captured is then forwarded to the transaction server 500, and securely stored in the consumer profile 524.

164. The merchant application 306 also requires the registration of at least one financial institution, which will be used during financial transactions. In one implementation, the financial institution account details may include, but not limited to, account holder's name, financial institution name, account number, mobile phone number and transaction authentication PIN. The financial institution account information captured is then forwarded to the transaction server 500, and securely stored in the consumer profile 524.

165. The POS application 306 has the same location functionality as that of the mobile application 206. The POS application 306, installed in the POS terminal 300, transmits the location information to the transaction server 500 using the same algorithms and the addition of the approved location as described for the mobile application 206.

Application Services

166. The merchant application 306 provides a menu with options to add, delete or edit any aspect of the available configurable parameters. For example, the merchant options may include, but not limited to, the creation of operator sub-accounts, financial institution transaction settings, and merchant personal and business information.

167. The main screen of the POS application 306 is comprised of a numeric keypad, which allows a merchant to enter a transaction amount. In one implementation the transaction amount can be reset every time a transaction is conducted. In another implementation the transaction amount is not reset to zero, and will always be populated with a default value selected by the merchant. In this scenario the merchant does not need to reenter a transaction amount, if the items charged are always of the same value, as for example in cases of ticket sales.

POS Location Locking

168. In one implementation, the POS terminal may be locked based on its location. For example a merchant may need to use a POS terminal in one specific location. Use of the POS in a location different from the one defined in the application will deem the POS terminal 300 inoperable. In another implementation the device may be configured as a portable POS. In this scenario the device can be used in any location area defined in the application. Typical cases for this mode of operation are the use in taxis, busses, mobile merchants and service professionals.

Operator Sub-Accounts

169. In one implementation, a merchant can define multiple sub-accounts for use by various POS operators. A merchant can define multitude of sub-accounts, each created with a unique operator name and a password. Operators using the POS terminal 300, are prompted to login to their sub-account for using the POS terminal 300. In turn, all operator sales are registered under their own sub-account, for easier tracking and reporting. Typical use of this feature is found in restaurants where multiple POS operators may use a single POS device to receive payments. Sales can then be tracked per sales person.

Transaction History

170. Full financial transaction history is available to a merchant. In one implementation, an operator can only view his or her own transaction history. In another implementation a merchant can view the complete transaction history from all operators. To access the transaction history of a merchant or a sub-account the corresponding account password needs to be provided.

Session Time Out

171. The session time out is similar to the customer application session timeout. In one implementation, the session timeout may be set to a long duration, as typical POS operation is typically enabled during business hours. For instance the time out session may be set to 12 hours, for extended business hours operation.

The invention claimed is:

1. A point of sale (POS) terminal of a merchant of a mobile payment system, the POS terminal comprising:
   a memory for storing POS terminal information for identifying the POS terminal, the POS terminal information being associated with merchant account information on a transaction server of the mobile payment system;
   a wireless interface for receiving location information of a mobile terminal of the mobile payment system and a unique ID for identifying a customer from mobile terminal, the unique ID being associated with customer account information and mobile terminal information on the transaction server; and
   a network interface for communicating with the transaction server for transmitting the received unique ID and location information of the mobile terminal, the POS terminal information, and a payment amount to the transaction server.

2. The POS terminal of claim 1, wherein the mobile terminal comprises:
   an identification (ID) unit adapted for storing and transmitting or embodying and conveying the unique ID for identifying the customer; and
   a mobile device adapted for:
      associating, in communication with the transaction server, the unique ID with the customer account information and the mobile terminal information; and
      receiving an authentication request message from the transaction server and, in response, transmitting a payment authorization code to the transaction server.

3. The POS terminal of claim 2, wherein the identification unit when adapted for storing and transmitting a unique ID is further adapted to transmit location information of the mobile terminal.

4. The POS terminal of claim 3, wherein the ID unit is detached from the mobile device.

5. The POS terminal of claim 2, wherein the unique ID is an optical machine-readable code carried by the ID unit.

6. The POS terminal of claim 5, wherein the ID unit is detached from the mobile device.

7. The POS terminal of claim 2, wherein the ID unit is detached from the mobile device.

8. The POS terminal of claim 1, wherein the transaction server comprises:
   a memory adapted for storing the unique ID identifying the customer, the customer account information, the mobile terminal information, the POS terminal information, and the merchant account information corresponding to a merchant account; wherein the customer account information is different from the unique ID and identifies an account of the customer to be used for performing a financial transaction with a financial institution to make a payment by the customer to the merchant account, and the mobile terminal information is different from the unique ID to enable the transaction server to establish a communication with the mobile terminal;
   a communication unit adapted for communicating with the mobile terminal, the POS terminal, and the financial institution; and
   a rules engine adapted for: associating the unique ID with the customer account information and the mobile terminal information through the mobile terminal or the POS terminal; receiving from the POS terminal financial transaction information including the unique ID, the POS terminal information, and a payment amount; authenticating the financial transaction information based on rules determining the validity of the unique ID and the POS terminal information; transmitting an authentication request message to the mobile terminal using the mobile terminal information associated with the received unique ID, and in response receiving a payment authorization code in response to the authentication request message from the mobile terminal; and transmitting the financial transaction information to the financial institution together with the customer account information associated with the received unique ID, the payment authorization code, and the merchant account information associated with the received POS terminal information.

9. The POS terminal of claim 8, wherein the financial transaction information received from the POS terminal further comprises location information of the mobile terminal and location information of the POS terminal, and wherein the authenticating the financial transaction information is based on rules determining the validity of the unique ID, the POS terminal information, the location information of the POS terminal, and the location information of the mobile terminal.

10. The POS terminal of claim 9, wherein the authenticating the financial transaction information based on rules determining the validity of the unique ID, the POS terminal information, the location information of the POS terminal, and the location information of the mobile terminal further comprises determining whether the location information of the POS terminal is within a predetermined POS area or whether the location information of the mobile terminal is within a predetermined mobile terminal area.

11. The POS terminal of claim 9, wherein the authenticating the financial transaction information based on rules determining the validity of the unique ID, the POS terminal information, the location information of the POS terminal, and the location information of the mobile terminal further comprises determining whether the location information of the mobile terminal is within a predetermined mobile terminal area.

12. The POS terminal of claim 9, wherein the authenticating the financial transaction information based on rules determining the validity of the unique ID, the POS terminal information, the location information of the POS terminal, and the location information of the mobile terminal further comprises determining whether the location information of the POS terminal matches with the location information of the mobile terminal.

13. The POS terminal of claim 8, wherein the memory is further adapted for storing a threshold, associated with the unique ID, for a payment amount which requires a payment authorization code, and wherein the rules engine is further adapted for authorizing the financial transaction only if the threshold associated with the received unique ID is exceeded by the payment amount.

14. The POS terminal of claim 13, wherein the authenticating the financial transaction information based on rules determining the validity of the unique ID, the POS terminal information, the location information of the POS terminal, and the location information of the mobile terminal further comprises determining whether the location information of the POS terminal is within a predetermined POS area or whether the location information of the mobile terminal is within a predetermined mobile terminal area.

15. The POS terminal of claim 14, wherein the authenticating the financial transaction information based on rules determining the validity of the unique ID, the POS terminal information, the location information of the POS terminal, and the location information of the mobile terminal further comprises determining whether the location information of the mobile terminal is within a predetermined mobile terminal area.

16. The POS terminal of claim 15, wherein the authenticating the financial transaction information based on rules determining the validity of the unique ID, the POS terminal information, the location information of the POS terminal, and the location information of the mobile terminal further comprises determining whether the location information of the POS terminal matches with the location information of the mobile terminal.

17. The POS terminal of claim 14, wherein the authenticating the financial transaction information based on rules determining the validity of the unique ID, the POS terminal information, the location information of the POS terminal, and the location information of the mobile terminal further comprises determining whether the location information of the POS terminal matches with the location information of the mobile terminal.

18. The POS terminal of claim 13, wherein the authenticating the financial transaction information based on rules determining the validity of the unique ID, the POS terminal information, the location information of the POS terminal, and the location information of the mobile terminal further comprises determining whether the location information of the mobile terminal is within a predetermined mobile terminal area.

19. The POS terminal of claim 13, wherein the authenticating the financial transaction information based on rules determining the validity of the unique ID, the POS terminal information, the location information of the POS terminal, and the location information of the mobile terminal further comprises determining whether the location information of the POS terminal matches with the location information of the mobile terminal.

20. A method performed in a point of sale (POS) terminal of a merchant of a mobile payment system, the method comprising the steps of:

storing POS terminal information for identifying the POS terminal, the POS terminal information being associated with merchant account information on a transaction server of the mobile payment system;

receiving by a wireless interface location information of a mobile terminal of the mobile payment system and a unique ID for identifying a customer from the mobile terminal, the unique ID being associated with customer account information and mobile terminal information on the transaction server;

establishing communication from a network interface between the transaction server and the mobile terminal to associate the POS terminal with the merchant account information and the POS terminal information on the transaction server; and transmitting by the network interface the received unique ID and location information of the mobile terminal, the POS terminal information, and a payment amount to the transaction server.

21. A non-transitory computer readable medium with an executable program stored thereon for use in a point of sale (POS) terminal of the type to be used by a merchant in a mobile payment system, the executable program having instructions that configure the POS terminal to:

store POS terminal information for identifying the POS terminal, the POS terminal information being associated with merchant account information on a transaction server of the mobile payment system;

receive, by a wireless interface, location information of a mobile terminal of the mobile payment system and a unique ID for identifying a customer from the mobile terminal, the unique ID being associated with customer account information and mobile terminal information on the transaction server;

establish communication from a network interface between the transaction server and the mobile terminal to associate the POS terminal with the merchant account information and the POS terminal information on the transaction server; and transmit by the network interface the received unique ID and location information of the mobile terminal, the POS terminal information, and a payment amount to the transaction server.

* * * * *